United States Patent
Tamai et al.

(10) Patent No.: US 8,752,948 B2
(45) Date of Patent: Jun. 17, 2014

(54) INKJET RECORDING INK CONTAINING FLUORINE BASED SURFACTANT, INKJET RECORDING INK SET, AND INKJET RECORDING APPARATUS CONTAINING THE INKJET RECORDING INK

(75) Inventors: Takashi Tamai, Kanagawa (JP);
Michihiko Namba, Kanagawa (JP);
Akihiko Matsuyama, Shizuoka (JP);
Akihiko Gotoh, Kanagawa (JP);
Kiyofumi Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 391 days.

(21) Appl. No.: 13/038,675

(22) Filed: Mar. 2, 2011

(65) Prior Publication Data
US 2011/0216123 A1 Sep. 8, 2011

(30) Foreign Application Priority Data

Mar. 2, 2010 (JP) ................................. 2010-045561
Jun. 16, 2010 (JP) ................................. 2010-137666

(51) Int. Cl.
*B41J 2/01* (2006.01)
(52) U.S. Cl.
USPC ........................................................ 347/100
(58) Field of Classification Search
USPC ........................................................ 347/100
See application file for complete search history.

(56) References Cited

U.S. PATENT DOCUMENTS

| | | | |
|---|---|---|---|
| 4,647,310 A | 3/1987 | Shimada et al. | |
| 4,711,668 A | 12/1987 | Shimada et al. | |
| 4,793,860 A | 12/1988 | Murakami et al. | |
| 5,431,720 A | 7/1995 | Nagai et al. | |
| 5,462,592 A | 10/1995 | Murakami et al. | |
| 5,514,208 A | 5/1996 | Nagai et al. | |
| 5,622,550 A | 4/1997 | Konishi et al. | |
| 5,810,915 A | 9/1998 | Nagai et al. | |

(Continued)

FOREIGN PATENT DOCUMENTS

| | | |
|---|---|---|
| WO | WO 2007/044110 A1 | 4/2007 |
| WO | WO 2008/055029 A2 | 5/2008 |
| WO | WO 2008/055029 A3 | 5/2008 |
| WO | WO 2010/002021 A1 | 1/2010 |

OTHER PUBLICATIONS

The Extended European Search Report issued Apr. 6, 2011, in Application No. 11156447.2-2102.

(Continued)

*Primary Examiner* — Laura Martin
(74) *Attorney, Agent, or Firm* — Oblon, Spivak, McClelland, Maier & Neustadt, L.L.P.

(57) ABSTRACT

An inkjet recording ink including a water-soluble organic solvent, a colorant, at least one fluorine-based surfactant having a chemical structure represented by Structural Formula (I) below, and water, Structural Formula (I)

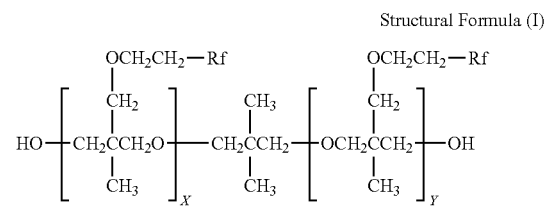

where Rf represents any one of $CF_3$, $CF_2CF_3$, $(CF_2)_3F$, and $(CF_2)_4F$, and X plus Y is an integer of 4 or 5.

15 Claims, 3 Drawing Sheets

(56) References Cited

U.S. PATENT DOCUMENTS

| | | |
|---|---|---|
| 5,879,439 A | 3/1999 | Nagai et al. |
| 5,882,390 A | 3/1999 | Nagai et al. |
| 5,952,048 A | 9/1999 | Tsubuko et al. |
| 5,972,082 A | 10/1999 | Koyano et al. |
| 5,993,524 A | 11/1999 | Nagai et al. |
| 6,120,589 A | 9/2000 | Bannai et al. |
| 6,231,652 B1 | 5/2001 | Koyano et al. |
| 6,261,349 B1 | 7/2001 | Nagai et al. |
| 6,578,958 B2 | 6/2003 | Gotoh et al. |
| 6,613,136 B1 | 9/2003 | Arita et al. |
| 6,637,875 B2 | 10/2003 | Kaneko et al. |
| 6,688,737 B2 | 2/2004 | Nagai et al. |
| 6,695,443 B2 | 2/2004 | Arita et al. |
| 6,730,149 B2 | 5/2004 | Arita et al. |
| 6,730,155 B2 | 5/2004 | Gotoh et al. |
| 6,786,588 B2 | 9/2004 | Koyano et al. |
| 6,899,751 B2 | 5/2005 | Arita et al. |
| 6,918,662 B2 | 7/2005 | Arita et al. |
| 7,033,013 B2 | 4/2006 | Koyano et al. |
| 7,094,813 B2 | 8/2006 | Namba et al. |
| 7,278,726 B2 | 10/2007 | Nagai |
| 7,284,851 B2 | 10/2007 | Bannai et al. |
| 7,370,952 B2 | 5/2008 | Inoue et al. |
| 7,374,608 B2 | 5/2008 | Arita et al. |
| 7,490,930 B2 | 2/2009 | Morohoshi et al. |
| 7,682,011 B2 | 3/2010 | Namba et al. |
| 7,699,457 B2 | 4/2010 | Namba et al. |
| 7,810,919 B2 | 10/2010 | Kojima et al. |
| 7,812,068 B2 | 10/2010 | Habashi et al. |
| 7,892,340 B2 | 2/2011 | Namba et al. |
| 7,919,544 B2 | 4/2011 | Matsuyama et al. |
| 7,938,527 B2 | 5/2011 | Ohshima et al. |
| 7,950,793 B2 | 5/2011 | Aruga et al. |
| 7,977,408 B2 | 7/2011 | Matsuyama et al. |
| 8,029,122 B2 | 10/2011 | Kojima et al. |
| 8,044,114 B2 | 10/2011 | Habashi et al. |
| 2006/0176349 A1 | 8/2006 | Nagai et al. |
| 2007/0088101 A1* | 4/2007 | Iu et al. ........................ 523/160 |
| 2007/0197685 A1 | 8/2007 | Aruga et al. |
| 2008/0092773 A1 | 4/2008 | Matsuyama |
| 2008/0188595 A1 | 8/2008 | Deardurff |
| 2008/0248260 A1* | 10/2008 | Kojima et al. .............. 428/195.1 |
| 2008/0273045 A1 | 11/2008 | Morohoshi et al. |
| 2008/0302268 A1 | 12/2008 | Arita et al. |
| 2009/0047431 A1 | 2/2009 | Hatada et al. |
| 2009/0098312 A1 | 4/2009 | Goto et al. |
| 2009/0114121 A1 | 5/2009 | Morohoshi et al. |
| 2009/0130313 A1 | 5/2009 | Ohshima et al. |
| 2009/0135218 A1 | 5/2009 | Morohoshi et al. |
| 2009/0162569 A1 | 6/2009 | Morohoshi et al. |
| 2009/0176070 A1 | 7/2009 | Goto et al. |
| 2009/0186162 A1 | 7/2009 | Namba et al. |
| 2009/0258196 A1 | 10/2009 | Nagashima et al. |
| 2009/0263632 A1 | 10/2009 | Kojima et al. |
| 2009/0291213 A1 | 11/2009 | Ohshima et al. |
| 2010/0020142 A1 | 1/2010 | Bannai et al. |
| 2010/0112219 A1 | 5/2010 | Yokohama et al. |
| 2010/0196601 A1 | 8/2010 | Goto et al. |
| 2010/0196602 A1 | 8/2010 | Koyano et al. |
| 2010/0196603 A1 | 8/2010 | Ohshima et al. |
| 2010/0196673 A1 | 8/2010 | Nagashima et al. |
| 2010/0209611 A1 | 8/2010 | Ohshima et al. |
| 2010/0215855 A1 | 8/2010 | Morohoshi et al. |
| 2010/0245416 A1 | 9/2010 | Ohshima et al. |
| 2010/0271435 A1 | 10/2010 | Kojima et al. |
| 2010/0277541 A1 | 11/2010 | Watanabe et al. |
| 2010/0279035 A1 | 11/2010 | Namba et al. |
| 2010/0285287 A1 | 11/2010 | Matsuyama et al. |
| 2010/0295891 A1 | 11/2010 | Goto et al. |
| 2010/0302326 A1 | 12/2010 | Morohoshi et al. |
| 2011/0057981 A1 | 3/2011 | Aruga et al. |
| 2011/0205288 A1 | 8/2011 | Matsuyama et al. |
| 2011/0310166 A1 | 12/2011 | Namba et al. |
| 2012/0236066 A1* | 9/2012 | Tamai et al. .................. 347/20 |

OTHER PUBLICATIONS

Omnova (Solutions Inc.), "PF-7002-Factsheet", (PolyFox), XP002629698, Retrieved from the Internet: URL:http://www.omnova.com/products/chemicals/documents/PF5001-PF7002_10Jan.pdf [retrieved on Mar. 24, 2011] 2 pages.

* cited by examiner

INKJET RECORDING INK CONTAINING FLUORINE BASED SURFACTANT, INKJET RECORDING INK SET, AND INKJET RECORDING APPARATUS CONTAINING THE INKJET RECORDING INK

CROSS-REFERENCE TO RELATED APPLICATIONS

The present application claims priority to Japanese patent applications JP 2010-045561, filed on Mar. 2, 2010 and JP 2010-137666, filed on Jun. 16, 2010, the disclosures of which are hereby incorporated by reference in their entireties.

BACKGROUND OF THE INVENTION

1. Field of the Invention

The present invention relates to an inkjet recording ink, an inkjet recording inkjet recording ink set, and an inkjet recording apparatus.

2. Description of the Related Art

When a pigment is used in an inkjet ink or when a common hydrocarbon-based activator is used in an inkjet ink, it is difficult to achieve the same level of uniformity of image solid parts and color developing ability as is obtained using a dye-based ink.

Further, dye inks also have problems in that in the formulation of a dye ink for inkjet recording, if no surfactant is added, the surface tension of the ink is excessively increased as high as 40 mN/m, and the surface tension of the ink cannot be sufficiently decreased with only addition of a water-soluble organic solvent, and therefore degradation of uniformity of image solid parts results.

For this reason, attempts have been made to add a surfactant to an ink composition to reduce the surface tension of ink and improve the uniformity of image solid parts to thereby improve the color developing ability.

With use of surfactants that have been conventionally used, an effect of reducing the surface tension of ink can be expected, however, it is not effective for improving image quality in terms of reducing white spots, color bleed, etc. The surface tension of the resulting ink may be decreased, however, the ink may have high foamability as an ink, and thus this adversely affects ink-filling properties and discharge stability.

Therefore, use of an anti-foaming agent containing silicone oil or silica causes degradation of storage stability of the resulting ink, and the ink adheres on a nozzle internal wall, leading to discharge failure.

To solve the above-mentioned problems, Michihiko (JP2006-316243) disclosed an ink containing a fluorine-based surfactant having a specific structure in its ink composition, in view toward improving the image quality and obtaining low frothing and high discharge stability of ink. According to the proposal, the image quality is improved, and it is effective in improving low-foaming property and discharge stability.

However, the fluorine-based surfactant having the following Structural Formula (II) described in JP2006-316243 has low foaming and sufficient discharge stability, but is poor in image quality, particularly in color developing ability, and thus the ink is insufficient to ensure an effective enhancement of color developing ability.

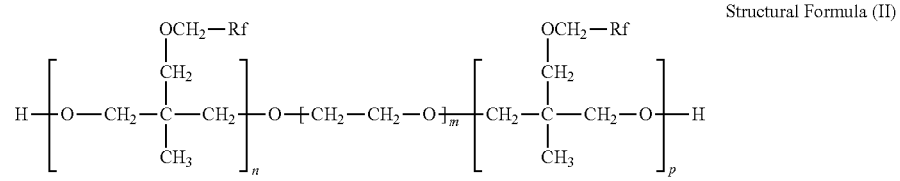

Structural Formula (II)

In Structural Formula (II), Rf represents $CF_3$ or $CF_2CF_3$, n is a positive integer of 1 to 4, m is a positive integer of 6 to 25, and p is a positive integer of 1 to 4.

Therefore, it has been required to immediately provide an inkjet recording ink which enables reducing white spots and color bleeding, forming high quality images, ensuring low foaming property and improving the discharge stability and its related properties.

The present invention aims to solve the above-mentioned conventional problems and to achieve the following object. That is, an object of the present invention is to provide an inkjet recording ink which contains a fluorine-based surfactant having a specific structure and which enables reducing white spots and color bleeding, forming high quality images, ensuring low foaming property (foamability) and improving the discharge stability in spite of exhibiting especially high color developing ability. Other objects of the invention include an inkjet recording ink set containing the improved ink, and an inkjet recording apparatus containing the improved ink.

BRIEF SUMMARY OF THE INVENTION

The present inventors carried out extensive studies and examinations to achieve the above-mentioned objects and have found that, by introducing at least one fluorine-based surfactant represented by the following structural formula (I), the resulting ink is made to have a low surface tension as compared with conventional inkjet dye inks. Although it has a high viscosity, no uneven distribution of dye inks on paper is involved, and the resulting ink is uniformly wetted and spread over paper. Thus, the uniform dying properties are significantly improved and thereby occurrence of white spots can be reduced. Besides the above mentioned properties, the present inventors have found that by using the fluorine-based surfactant according to the present invention in inks constituting an inkjet recording ink set, the following special effects can be exhibited:

the permeation balance among these inks are well maintained, and thus color bleed can be suppressed, which makes it possible to obtain a high quality image, the resulting ink is hardly foamed without adding an anti-foaming agent having cohesiveness as seen in silicone-based anti-foaming agents, and the discharge stability can also be ensured.

These objects and others have been achieved by the present invention, the first embodiment of which provides an inkjet recording ink comprising:
at least one water-soluble organic solvent,
at least one colorant,
at least one fluorine-based surfactant having a chemical structure represented by Structural Formula (I), and
water,

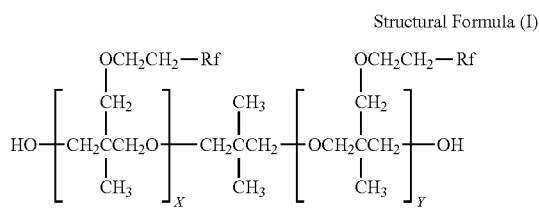

Structural Formula (I)

wherein Rf represents any one of $CF_3$, $CF_2CF_3$, $(CF_2)_2CF_3$, and $(CF_2)_3CF_3$, and X plus Y is an integer of 4 or 5.

In a second embodiment the present invention provides the inkjet recording ink described above, wherein an amount of the fluorine-based surfactant is 0.01% by mass to 10% by mass based on the total mass of the inkjet recording ink.

In a preferred embodiment, the present invention provides an inkjet ink as described above, wherein in formula (I), X is 1 to 4, and Y is 1 to 4.

In a particularly preferred embodiment, the present invention provides an inkjet ink as described above, wherein Rf of formula (I) is $(CF_2)_3CF_3$, X is 2, and Y is 2.

In an another preferred embodiment, the present invention provides an inkjet recording ink as described above, wherein the colorant is at least one selected from the group consisting of a dye, a pigment and a colored fine particle.

Moreover, the present invention provides an inkjet recording ink set comprising:
an inkjet recording ink as described above, wherein the colorant is a black colorant, and
at least one inkjet recording ink as described above, wherein the colorant is a colored colorant.

Further, the present invention provides an apparatus for forming a image comprising:
an inkjet ink discharging unit configured to discharge an ink drop to form an image,
the inkjet ink comprises:
at least one water-soluble organic solvent,
at least one colorant,
at least one fluorine-based surfactant of formula (I), and
water,

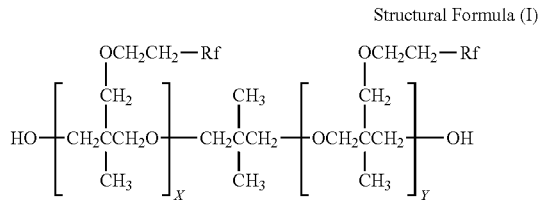

Structural Formula (I)

wherein Rf represents any one of $CF_3$, $CF_2CF_3$, $(CF_2)_2CF_3$, and $(CF_2)_3CF_3$, and X plus Y is an integer of 4 or 5.

The foregoing discussion embodiment certain aspects of the present invention. Additional embodiment aspects of present invention are discussed in the following detailed description of the invention. The following description is to be regarded as illustrative in nature, and not as restrictive.

DETAILED DESCRIPTION OF THE INVENTION

Inkjet Recording Ink

Figure 1:
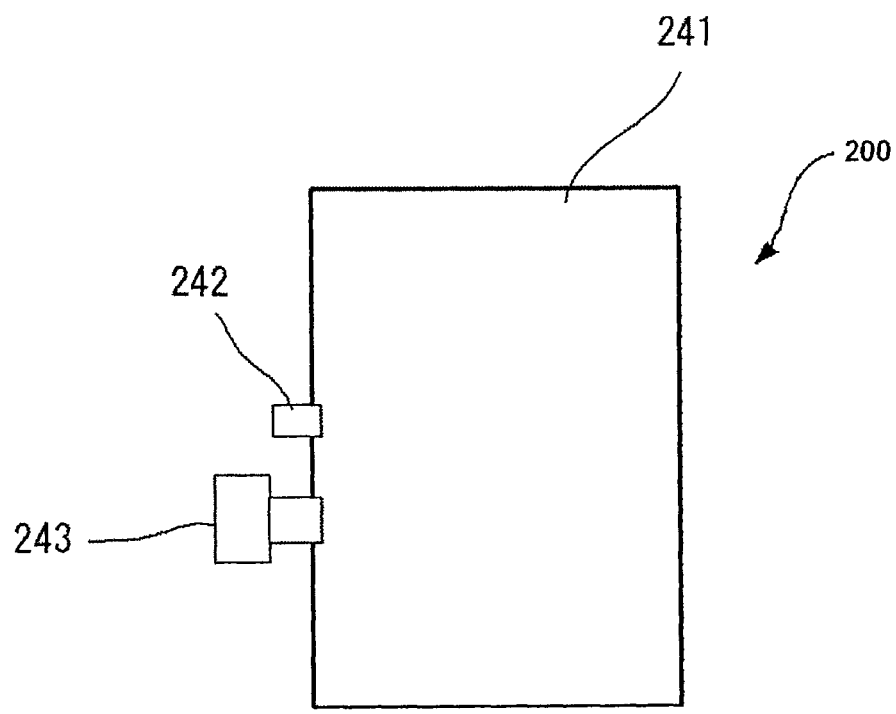
FIG. 1 is a schematic diagram illustrating one example of an ink cartridge according to the present invention.

An inkjet recording ink according to the present invention contains at least water, a water-soluble organic solvent, a colorant, and a fluorine-based surfactant represented by the following Structural Formula (I), and further optionally contains other components as required.

Fluorine-Based Surfactant Having Chemical Structure Represented by Structural Formula (I)

The inkjet recording ink of the present invention contains at least one fluorine-based surfactant represented by the following Structural Formula (I).

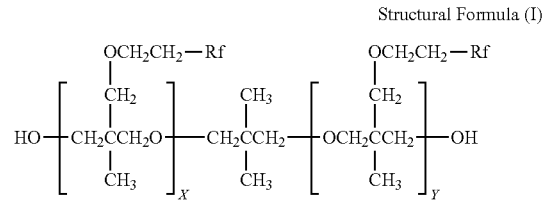

Structural Formula (I)

wherein Rf represents any one of $CF_3$, $CF_2CF_3$, $(CF_2)_3F$ and $(CF_2)_4F$, and X plus Y is an integer of 4 or 5. X is preferably 1 to 4, and Y is preferably 1 to 4. More preferably X is 1 to 3 and Y is 1 to 3.

Among these compounds, a fluorine-based surfactant having a chemical structure represented by Structural Formula (I), in which $Rf=(CF_2)_4F$, X=2, Y ■ 2, and X+Y=4 in Structural Formula (I), is particularly preferable from the viewpoint of reducing the surface tension and having an effect of suppressing foams.

The fluorine-based surfactant having a chemical formula represented by Structural Formula (I) above reduces the surface tension of an ink, improving image quality such as high color developing ability and exhibiting less foamability, and thus provides an ink having good discharge.

The fluorine-based surfactant having a chemical formula represented by Structural Formula (I), may be suitably synthesized by conventionally known methods or may be a commercially available product. An examples of a commercially available product of the fluorine-based surfactant is PF7002 (product of OMNOVA Solutions Inc.).

The amount of the fluorine-based surfactant having a chemical formula represented by Structural Formula (I) contained in the inkjet recording ink according to the invention is not particularly limited and may be suitably selected in accordance with the intended use. It is, however, preferably 0.01% by mass to 10% by mass, more preferably 0.1% by mass to 5% by mass, and particularly preferably 0.1% by mass to 0.5% by mass. When the amount of the fluorine-based surfactant is less than 0.01% by mass, an improvement effect of the color developing ability may not be obtained. In contrast, when it is more than 10% by mass, the storage stability of the ink may degrade.

The fluorine-based surfactants having a chemical formula represented by Structural Formula (I) above may be used alone or in combination. Further, the fluorine-based surfactant may be added into an ink liquid medium, together with other surfactants conventionally known to one of skill in the art for preparation of an ink.

Other surfactants which may be used in combination with the fluorine-based surfactant of formula (I) are not particularly limited and may be suitably selected in accordance with the intended use. For example, a fluorine-based surfactant other than the fluorine-based surfactant having a chemical formula represented by Structural Formula (I), may be a nonionic surfactant, an anionic surfactant, an amphoteric surfactant, an acetylene glycol-based surfactant or a mixture thereof.

Examples of the anionic surfactant include alkylallylsulfonate, alkylnaphthalene sulfonate, alkyl phosphonate, alkyl sulfate, alkyl sulfonate, alkylether sulfate, alkyl sulfosuccinate, alkylester sulfate, alkylbenzene sulfonate, alkyl diphenyl ether disulfonate, alkylarylether phosphate, alkyl arylether sulfate, alkyl arylether sulfate, olefin sulfonate, alkane olefin sulfonate, polyoxyethylene alkylether phosphate, ether carboxylate, sulfosuccinate, α-sulfo fatty acid ester, fatty acid salt, condensates of higher fatty acid and amino acid, and naphthenate.

Examples of the nonionic surfactant include polyoxyethylene alkylether, polyoxyethylene alkylallylether, polyoxyethylene alkylphenyl ether, polyoxyethylene glycol ester, polyoxyethylene fatty acid amide, polyoxyethylene fatty acid ester, polyoxyethylene polyoxypropylene glycol, glycerin ester, sorbitan ester, sucrose ester, polyoxyethylene ether of glycerin ester, polyoxyethylene ether of sorbitan ester, polyoxyethylene ether of sorbitan ester, fatty acid alkanolamide, amine oxide, polyoxyethylene alkylamine, glycerin fatty acid ester, sorbitan fatty acid ester, polyoxyethylene sorbitan fatty acid ester, polyoxyethylene sorbitol fatty acid ester, and alkyl (poly)glycoside.

Examples of the amphoteric surfactant include imidazoline derivatives such as imidazolinium betaine; dimethyl alkyl lauryl betaine, alkyl glycine, and alkyldi(aminoethyl)glycine.

Examples of the acetylene glycol-based surfactant include acetylene glycol-based compounds such as 2,4,7,9-tetramethyl-5-desine-4,7-diol, 3,6-dimethyl-4-octine-3,6-diol, and 3,5-dimethyl-1-hexine-3-ol (e.g., SURFYNOL 104, 82, 465, 485 and TG available from Air Products and Chemicals Inc.).

The amount of the other surfactants used in combination with the fluorine based surfactant of formula (I) may be suitably adjusted within a range of not impairing the object and effects of the present invention.

Colorant

As the colorant, at least any one of a pigment, a dye and colored fine particles may be used.

Examples of the colorant include water-soluble dyes, oil-soluble dyes, and dispersion dyes. From the viewpoint of excellent absorbability and encapsulation property, oil-soluble dyes and dispersion dyes are preferable, however, from the viewpoint of light resistance of obtained images, pigments are preferably used.

Colored Fine Particles

As the colored fine particles, an aqueous dispersion of polymer fine particles in which a coloring material is included is preferably used.

Here, the wording "in which a coloring material is included" means one of or both of a state where a coloring material is included in polymer fine particles and a state where a coloring material is adsorbed on surfaces of polymer fine particles. In this case, all the amount of a coloring material to be included in the inkjet recording ink of the present invention is not necessarily included in or absorbed onto the polymer fine particles, and the coloring material may be dispersed in an emulsion, within the range of not impairing the effects of the present invention. The coloring material is not particularly limited, as long as it is a water-insoluble or sparingly water-soluble coloring material which can be adsorbed by the polymer, and may be suitably selected in accordance with the intended use.

Here, the wording "water-insoluble or sparingly water-soluble" means that the coloring material in an amount of 10 parts by mass or more is not dissolved in 100 parts by mass of water at 20° C. The "dissolved" means that no separation and sedimentation of the coloring material is visually recognized on the surface layer or the bottom layer of the aqueous solution.

The average particle diameter of the polymer fine particles (colored fine particles) in which the coloring material is included is not particularly limited and may be suitably selected in accordance with the intended use. The average particle diameter is preferably 0.16 μm or smaller in the inkjet recording ink.

The amount of the colored fine particles contained in the inkjet recording ink is not particularly limited and may be suitably selected in accordance with the intended use. It is, however, preferably 8% by mass to 20% by mass, and more preferably 8% by mass to 12% by mass, of the total solids content of the ink.

Dye

Each of the dyes is preferably dissolved in an amount of 2 g/L or more, and more preferably in an amount of 20 g/L to 600 g/L in an organic solvent, for example, a ketone-based solvent, from the viewpoint that they can be efficiently impregnated into polymer fine particles.

The amount of the dye is not particularly limited and may be suitably selected in accordance with the intended use. It is preferably 1.5% by mass to 10% by mass, and more preferably 2% by mass to 7% by mass to the total amount of the inkjet recording ink. When the amount of the dye is less than 1.5% by mass, the intended concentration may not be obtained, and when it is more than 10% by mass, the dye may be crystallized and precipitated.

The water-soluble dye is a dye categorized as an acid dye, a direct dye, a basic dye, a reactive dye or a food dye in the Color Index. Preferably, a water-soluble dye excellent in water resistance and light resistance is used.

Examples of the acid dye and food dye include C.I. Acid Yellow 17, 23, 42, 44, 79, and 142; C.I. Acid Red 1, 8, 13, 14, 18, 26, 27, 35, 37, 42, 52, 82, 87, 89, 92, 97, 106, 111, 114, 115, 134, 186, 249, 254, and 289; C.I. Acid Blue 9, 29, 45, 92, and 249; C.I. Acid Black 1, 2, 7, 24, 26, and 94; C.I. Food Yellow 3, 4; C.I. Food Red 7, 9, 14; and C.I. Food Black 1, and 2.

Examples of the direct dye include C.I. Direct Yellow 1, 12, 24, 26, 33, 44, 50, 86, 120, 132, 142, and 144; C.I. Direct Red 1, 4, 9, 13, 17, 20, 28, 31, 39, 80, 81, 83, 89, 225, and 227; C.I. Direct Orange 26, 29, 62, and 102; C.I. Direct Blue 1, 2, 6, 15, 22, 25, 71, 76, 79, 86, 87, 90, 98, 163, 165, 199, and 202; and C.I. Direct Black 19, 22, 32, 38, 51, 56, 71, 74, 75, 77, 154, 168, and 171.

Examples of the basic dye include C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155; and C.I. Basic Black 2, and 8.

Examples of the reactive dye include C.I. Reactive Black 3, 4, 7, 11, 12, and 17; C.I. Reactive Yellow 1, 5, 11, 13, 14, 20, 21, 22, 25, 40, 47, 51, 55, 65, and 67; C.I. Reactive Red 1, 14, 17, 25, 26, 32, 37, 44, 46, 55, 60, 66, 74, 79, 96, and 97; and C.I. Reactive Blue 1, 2, 7, 14, 15, 23, 32, 35, 38, 41, 63, 80, and 95.

Particularly preferred examples of the dye are, in terms of excellence in color developing ability, water resistance and light resistance, C.I. Direct Blue 199 (PRO-JET Cyan 1 Liquid, produced by Fuji Film Imaging Colorant Corp.), C.I. Acid Red 249 (PRO-JET Magenta 1 Liquid, produced by Fuji Film Imaging Colorant Corp.), C.I. Direct Yellow 132 (BAY-SCRIPT Yellow GGN Liquid, produced by LANXESS Deutschland GmbH), C.I. Direct Black 195 (PRO-JET Fast Black 2 Liquid, produced by Fuji Film Imaging Colorant Corp.), C.I. Direct Blue 199 (DAIWA IJ BLUE 319HL, produced by Daiwa Kasei Industry Co., Ltd.), DUASYN Black HEF-SF Liquid (C.I. Direct Black 168, dye concentration: 20% by mass, produced by Clariant Japan K.K.), C.I. Acid Yellow 23 (Acid Yellow 23, produced by Daiwa Kasei Industry Co., Ltd.), C.I. Reactive Red 31 (PRO-JET Magenta 3B-OA Liquid, produced by Fuji Film Imaging Colorant Corp.), BAY-SCRIPT Black SP liquid (dye concentration: 30% by mass, produced by LANXESS Deutschland GmbH), and C.I. Direct Blue 86 (Direct Blue 86, produced by Daiwa Kasei Industry Co., Ltd.).

Pigment

The pigment is not particularly limited and may be suitably selected in accordance with the intended use. Examples thereof include inorganic pigments and organic pigments.

Examples of the inorganic pigments include titanium oxide, iron oxide, calcium carbonate, barium sulfate, aluminum hydroxide, barium yellow, cadmium red, chrome yellow, and carbon black. Among these, carbon black is preferable. Examples of the carbon black include those produced by a known method, such as a contact method, furnace method and thermal method.

Examples of the organic pigments include azo pigments, polycyclic pigments, dye chelates, nitro pigments, nitroso pigments, aniline black. Among these, azo pigments, and polycyclic pigments are preferable. Examples of the azo pigments are azo lake, insoluble azo pigments, condensed azo pigments, and chelate azo pigments. Examples of the polycyclic pigments are phthalocyanine pigments, perylene pigments, perynone pigments, anthraquinone pigments, quinacridone pigments, dioxazine pigments, indigo pigments, thioindigo pigments, isoindolinone pigments, and quinophthalone pigments. Examples of the dye chelates are basic dye type chelates, and acid dye type chelates.

The color of the pigment is not particularly limited and may be suitably selected in accordance with the intended use. For example, black color pigments for black ink, and color pigments for color ink are exemplified. These may be used alone or in combination.

Examples of the black color pigments for black ink include carbon blacks (C.I. Pigment Black 7) such as furnace black, lump black, acetylene black, an channel black; metals such as copper, iron (C.I. Pigment Black 11) and titanium oxides; and organic pigments such as aniline black (C.I. Pigment Black 1).

Examples of the color pigments for yellow color ink include C.I. Pigment Yellow 1 (Fast Yellow G), 3, 12 (Disazo Yellow AAA), 13, 14, 17, 23, 24, 34, 35, 37, 42 (Yellow iron oxide), 53, 55, 74, 81, 83 (Disazo Yellow HR) 95, 97, 98, 100, 101, 104, 108, 109, 110, 117, 120, 128, 138, 150, and 153.

Examples of the color pigments for magenta color ink include C.I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 101 (colcothar), 104, 105, 106, 108 (Cadmium Red), 112, 114, 122 (dimethyl quinacridone), 123, 146, 149, 166, 168, 170, 172, 177, 178, 179, 185, 190, 193, 209, and 219.

Examples of the color pigments for cyan color ink include C.I. Pigment Blue 1, 2, 15 (Copper Phthalocyanine Blue R), 15:1, 15:2, 15:3 (Phthalocyanine Blue G), 15:4, 15:6 (Phthalocyanine Blue E), 16, 17:1, 56, 60, and 63.

Examples of the color pigments for neutral color for red, green and blue color inks include C.I. Pigment Red 177, 194, 224, C.I. Pigment Orange 43, C.I. Pigment Violet 3, 19, 23, 37, and C.I. Pigment Green 7, and 36.

As the pigment, a self-dispersible type color pigment which can be stably dispersed without using a dispersant in which at least one hydrophilic group is bonded, directly or via other atomic group, to the surface of the pigment, is preferably used. As a result, there is no need to use a dispersant for dispersing the pigment, as seen in conventional inks. As the self-dispersible type pigment, those having ionicity, anionically charged ones, and cationically charged ones are preferable.

Examples of the anionic hydrophilic group include —COOM, —$SO_3M$, —$PO_3HM$, —$PO_3M_2$, —$SO_2NH_2$, —$SO_2NHCOR$ (where M represents a hydrogen atom, an alkali metal, ammonium or organic ammonium; R represents an alkyl group having 1 to 12 carbon atoms, a phenyl group that may have a substituent or a naphthyl group that may have a substituent). It is preferable to use a color pigment in which —COOM, or —$SO_3M$ is bonded to the surface of the color pigment.

Examples of "M" in the hydrophilic groups include lithium, sodium, and potassium. Examples of the organic ammonium include mono or trimethyl ammonium, mono or triethyl ammonium, and mono or trimethanol ammonium. As a method of obtaining the anionically charged color pigment (as a method of introducing —COONa into the surface of a color pigment) include a method of subjecting a color pigment to an oxidative treatment with hypochlorous acid soda; a method of sulfonating a color pigment, and a method of reacting diazonium salt with a color pigment.

As the cationic hydrophilic group, for example, quaternary ammonium groups are preferable. A pigment having a surface to which a quaternary ammonium group is bonded is preferable as the coloring material.

As a method of producing the cationic self-dispersible type carbon black having a surface to which a hydrophilic group is bonded, as far as a method of bonding N-ethylpyridyl group to a color pigment concerned, there may be exemplified a method of treating carbon black with 3-amino-N-ethyl pyridium bromide. Note that the production method is not limited thereto.

In the present invention, the hydrophilic group may be bonded to the surface of carbon black via other atom groups. Examples of the other atomic groups include alkyl groups having 1 to 12 carbon atoms, a phenyl group that may have a substituent or a naphthyl group that may have a substituent. Specific examples of the compound where a hydrophilic group is bonded to the surface of carbon black via other atomic groups include, but not limited to, $-C_2H_4COOM$ (where M represents alkali metal or quaternary ammonium); $-PhSO_3M$ (where Ph represents a phenyl group, M represents alkali metal or quaternary ammonium), and $-C_5H_{10}NH_3^+$.

In the present invention, a pigment dispersion liquid using a pigment dispersant can also be used.

Examples of the pigment dispersant (as the hydrophilic polymer) include natural pigment dispersants (e.g., plant polymers such as Arabic gum, tragacanth gum, guar gum, karaya gum, locust bean gum, arabinogalactan, pectin, and quince seed starch); seaweed-based polymers (e.g., alginic acid, carrageenan, and agar); animal based polymers (e.g., gelatin, casein, albumin, and collagen); and microbe based polymers (e.g., xanthan gum, and dextran).

Examples of semi-synthetic pigment dispersant include fiber based polymers (e.g., methyl cellulose, ethyl cellulose, hydroxyethyl cellulose, hydroxypropyl cellulose, and carboxymethyl cellulose; starch based polymers (e.g., starch sodium glycolate, and starch sodium phosphate ester); and seaweed based polymers (e.g., sodium alginate, and alginic acid propylene glycol ester).

Examples of purely synthetic dispersant include vinyl type polymers such as poly(vinyl alcohol), poly(vinyl pyrrolidone), poly(vinyl methyl ether) and the like; acrylic resins such as non-crosslinked polyacrylamide, polyacrylic acid or its alkali metal salts, water soluble styrene acrylic resin and the like; water soluble styrene maleic acid resins; water soluble vinylnaphthalene acrylic resins; water soluble vinylnaphthalene maleic acid resins; polyvinyl pyrrolidone, poly (vinyl alcohol); alkali metal salts of β-naphthalene sulfonic acid formalin condensates; polymeric compounds containing a salt of cationic functional groups such as quaternary ammonium, amino group and the like on the side chain; natural polymeric compounds such as shellac.

Among these, the homopolymers of acrylic acid, methacrylic acid, styrene acrylic acid and copolymers with monomers containing other hydrophilic groups that are polymers to which carboxyl groups had been introduced are particularly preferred as polymeric dispersants.

The weight average molecular weight of these copolymers is preferably 3,000 to 50,000, more preferably 5,000 to 30,000, and particularly preferably 7,000 to 15,000.

The mass ratio of a mixture of the pigment to the dispersant is not particularly limited and may be suitably selected in accordance with the intended use. It is preferably in the range of 1:0.06 to 1:3, and more preferably 1:0.125 to 1:3.

The addition amount of the pigment serving as the colorant to the inkjet recording ink is not particularly limited and may be suitably selected in accordance with the intended use. It is preferably 0.5% by mass to 25% by mass, and more preferably 2% by mass to 15% by mass. Generally, the higher the concentration of the pigment, the higher the image density and the better image quality results. However, too high a pigment concentration may cause adverse affects on reliability, for example, on fixability, discharge stability and clogging resistance. However, in the present invention, even when the addition amount of the pigment is increased, the fixability can be ensured with maintaining the reliability such as discharge stability and clogging resistance.

Water-Soluble Organic Solvent

The inkjet recording ink of the present invention uses water and a water-soluble solvent as a liquid medium. For the purposes of making the inkjet recording ink have desired physical properties and preventing the inkjet recording ink from drying, and improving the dissolution stability of the inkjet recording ink, the following water-soluble organic solvents may be used.

The water-soluble organic solvent is not particularly limited and may be suitably selected in accordance with the intended use. Examples thereof include polyhydric alcohols such as ethylene glycol, diethylene glycol, triethylene glycol, polyethylene glycol, propylene glycol, dipropylene glycol, tripropylene glycol, polypropylene glycol, 1,3-propanediol, 1,3-butanediol, 2,3-butanediol, 1,4-butanediol, 3-methyl-1,3-butanediol, 1,5-pentanediol, 1,6-hexanediol, tetraethylene glycol, 1,6-hexanediol, 2-methyl-2,4-pentanediol, 3-methyl-1,5-pentanediol, thiodiglycol, glycerin, 1,2,6-hexane triol, 1,2,4-butane triol, 1,2,3-butane triol, 2,2,4-trimethyl-2,3-pentanediol, and 3-Methylpentane-1,3,5-triol; polyhydric alcohols such as polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether; polyhydric alcohol aryl ethers such as ethylene glycol monophenyl ether, and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinon, and ε-caprolactam; amides such as formamide, N-methylformamide, formamide, and N,N-dimethylformamide; amines such as monoethanol amine, diethanol amine, triethanolamine, monoethyl amine, diethyl amine, and triethyl amine; sulfur compounds such as diemthylsulfoxide, sulfolane, and thiodiethanol; propylene carbonate, ethylene carbonate, and γ-butyrolactone. These solvents may be used alone or in combination.

Among these, preferred are glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, ethylene glycol monobutyl ether, 1,6-hexanediol, 2-methyl-2,4-pentanediol, 3-methyl-1,5-pentanediol, polyethylene glycol, 1,2,4-butane triol, 1,2,6-hexane triol, thiodiglycol, 2-pyrrolidone, N-methyl-2-pyrrolidone, and N-hydroxyethyl-2-pyrrolidone, with 3-methyl-1,3-butanediol, 2-methyl-2,4-pentanediol, 1,3-butanediol, and 3-methyl-1,5-pentanediol being particularly preferable.

The amount of the water-soluble organic solvent contained in the inkjet recording ink is not particularly limited and may be suitably selected in accordance with the intended use. It is preferably 10% by mass to 50% by mass, and more preferably 20% by mass to 40% by mass.

Other Water-Soluble Organic Solvent Usable in Combination

The inkjet recording ink of the present invention may contain other water-soluble organic solvent (including solvents) than the water-soluble organic solvents listed above in combination.

As the other water-soluble organic solvents, monosaccharide, disaccharide, fructo-oligosaccharides (including trisaccharide and tetrasaccharide), polysaccharide, and derivatives thereof are exemplified. Among these, glucose, mannose, fructose, ribose, xylose, arabinose, galactose, maltose, cellobiose, lactose, sucrose, trehalose, maltotriose are preferable. As the polysaccharide, a broad definition of saccharide is used and a compound widely present in the nature, such as α-cyclodextrin, cellulose, may be included.

As derivatives of the saccharide, reduced saccharides of the saccharides [for example, saccharide alcohols (represented by the general formula $HOCH_2(CHOH)_nCH_2OH$ where n represents an integer of 2 to 5)], oxidized saccharides (for example, aldonic acid, uronic acid and the like), amino acids, thio acids and the like may be cited. Among these, saccharide alcohols are particularly preferred. As the saccharide alcohols, maltitol, sorbit and the like, for example, may be exemplified.

The amount of the saccharide is not particularly limited and may be suitably selected in accordance with the intended use. It is preferably 0.1% by mass to 40% by mass, and more preferably 0.5% by mass to 30% by mass relative to the inkjet recording ink.

Water

Examples of the water, ion exchanged water, ultrafiltration water, reverse-percolation water, pure water such as distillation water, and ultrapure water. These may be used alone or in combination.

Other Components

The other components are not particularly limited and may be suitably selected in accordance with the intended use. Examples thereof include a resin fine particles, a penetrant, an aminopropanediol compound, a moisture retention maintaining agent, an antiseptic/fungicide, a pH adjustor, an anti-corrosion agent, an antioxidant, a ultraviolet absorber, an oxygen absorber, a light stabilizer, an anti-foaming agent, a specific resistance adjustor, and a viscosity adjustor. These may be used alone or in combination.

The Resin Fine Particle

In the present invention, resin fine particles may also be used.

The resin fine particles are not particularly limited and may be suitably selected in accordance with the intended use. For example, a silicone-modified acrylic resin obtainable by polymerization of an acrylic-based monomer and a silane compound in the presence of an emulsifier is preferably exemplified. Resin fine particles may be added to the ink to improve ink fixation to the substrate.

Penetrant

The penetrant is not particularly limited and may be suitably selected in accordance with the intended use. Examples thereof include polyoxyethylene alkylether, polyoxyethylene alkylphenyl ether, polyoxyethylene glycol ester, polyoxyethylene-polyoxypropylene decyl ether.

Specific examples of the penetrant include 2-ethyl-1,3-hexanediol, 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol. These may be used alone or in combination. Among these, 2-ethyl-1,3-hexanediol is particularly preferable.

The amount of the penetrant is not particularly limited and may be suitably selected in accordance with the intended use. It is preferably 10% by mass to 40% by mass, and more preferably 20% by mass to 30% by mass to the total amount of the inkjet recording ink.

Aminopropanediol Compound

The aminopropanediol compound is a water-soluble organic basic compound which may also serve as a pH adjustor. From the viewpoint of improving the dispersion stability of the pigments and ensuring reliability, aminopropanediol derivatives are preferable.

The aminopropanediol derivative is not particularly limited and may be suitably selected in accordance with the intended use. Examples thereof include 1-amino-2,3-propanediol, 1-methylamino-2,3-propanediol, 2-amino-2-methyl-1,3-propanediol, and 2-amino-2-ethyl-1,3-propanediol. Among these, 2-amino-2-ethyl-1,3-propanediol is particularly preferable.

Moisture Retention Maintaining Agent

The inkjet recording ink of the present invention may contain ureas or alkyl glycine as desired. Examples of the ureas include urea, thio urea, ethylene urea, and 1,3-dimethyl-2-imidazolidinone. Examples of the alkyl glycine include N-methyl glycine, N,N-dimethyl glycine, and N-ethyl glycine. Both the urea and alkyl glycine basically maintain excellent moisture retention (which leads to improvement in storage stability) in water-based inks and exhibit excellent effects of discharge stability and clogging resistance of recoating heads of inkjet printers. In addition, they are widely used for adjusting the viscosity and surface tension of an ink and excellent in clogging resistance, and thus they can prevent clogging of inkjet heads and discharge failure such as disruption of the ink droplet path to the substrate.

Typically, the addition amount of the ureas or alkyl glycine to the inkjet recording ink is preferably 0.5% by mass to 50% by mass, and more preferably 1% by mass to 20% by mass. When the addition amount is less than 0.5% by mass, properties desired by an inkjet printer recording head may not be satisfied. When the addition amount is more than 50% by mass, the resulting ink is thickened, and this may lead to adverse affects on storage stability and discharge failure of the ink.

Antiseptic/Fungicide

Examples of the antiseptic/fungicide include 1,2-benzisothiazolin-3-one, sodium dehydroacetate, sodium sorbate, sodium 2-pyridinethiol-1-oxide, sodium benzoate, and sodium pentachlorophenol.

pH Adjustor

The pH adjustor is not particularly limited, as long as it can adjust the pH to 7 or higher without adversely affecting the ink to which the pH adjustor is added, and pH adjustors conventionally known in the art may be employed.

Examples of the pH adjustor include alkanol amines such as diethanol amine, and triethanolamine; hydroxides of alkali metal elements such as lithium hydroxide, sodium hydroxide, and potassium hydroxide; and carbonates of alkali metal such as ammonium hydroxide, quaternary ammonium hydroxide, quaternary phosphonium hydroxide, lithium carbonate, sodium carbonate, and potassium carbonate.

Anti-Corrosion Agent

Examples of the anti-corrosion agent include acid sulfite, sodium thiosulfate, ammonium thiodiglycolate, diisopropyl ammonium nitrite, pentaerythritol tetranitrate, and dicyclohexyl ammonium nitrite.

Antioxidant

Examples of the antioxidant include phenol-based antioxidants (including hindered phenol-based antioxidants), amine-based antioxidants, sulfur-based antioxidants, and phosphorus-based antioxidants.

Specific examples of the phenol-based antioxidants (including hindered phenol-based antioxidants) include butylated hydroxyanisole, 2,6-di-tert-butyl-4-ethylphenol, stearyl-β-(3,5-di-tert-butyl-4-hydroxyphenyl)propyonate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propyonyloxy]ethyl] 2,4,8,10-tetrakispiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis[methylene-3-(3',5'-di-tert-butyl-4'-hydroxyphenyl)propionate]methane.

Examples of the amine-based antioxidant include phenyl-β-naphthylamine, α-naphthylamine, N,N'-di-sec-butyl-p-phenylenediamine, phenothiadine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisol, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3(3,5-di-tert-butyl-4-dihydroxyphenyl)propionate]methane, 1,1,3-tris(2-methyl-4-hydroxy-5-tert-butylphenyl)butane.

Examples of the sulfur-based antioxidant include dilauryl 3,3'-thiodipropionate, distearyl thiodipropionate, laurylstearyl thiodipropionate, dimyristyl 3,3'-thiodipropionate, distearyl β,β'-thiodipropionate, 2-mercaptobenzoimidazole, and dilauryl sulfide.

Examples of the phosphate-based antioxidant include triphenyl phosphite, octadecyl phosphite, triisodecyl phosphite, trilauryl trithio phosphite, and trinonylphenyl phosphite.

Ultraviolet Absorber

Examples ultraviolet absorber include a benzophenone-based ultraviolet absorber, a benzotriazole-based ultraviolet absorber, a salicylate-based ultraviolet absorber, a cyanoacrylate-based ultraviolet absorber, and a nickel complex salt-based ultraviolet absorber.

Examples of the benzophenone-based ultraviolet absorber include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole-based ultraviolet absorber include 2-(2'-hydroxy-5'-tert-octophenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate-based ultraviolet absorber include phenylsalicylate, p-tert-butylphenylsalicylate, and p-octylphenylsalicylate.

Examples of the cyanoacrylate-based ultraviolet absorber include ethyl-2-cyano-3,3'-diphenylacrylate, methyl-2-cyano-3-methyl-3-(p-methoxyphenyl)acrylate, and butyl-2-cyano-3-methyl-3-(p-methoxyphenyl)acrylate.

Examples of the nickel complex salt-based ultraviolet absorber include nickelbis(octylphenyl)sulfide, 2,2'-thiobis(4-tert-octylphenylate)-n-butylamine nickel (II), 2,2'-thiobis(4-tert-octylphelate)-2-ethylhexylamine nickel (II), and 2,2'-thiobis(4-tert-octylphelate)triethanolamine nickel (II).

Preparation Method of InkJet Recording Ink

The inkjet recording ink of the present invention may be produced by dispersing or dissolving, in an aqueous medium of water and at least one water-soluble organic solvent, the colorant and the at least one fluorine-based surfactant containing a compound represented by Structural Formula (I) described above and further other optional components, and when required, stirring and mixing the dispersion liquid or solution. The dispersion treatment can be performed by, for example, a sand mill, a homogenizer, a ball mill, a paint shaker, a ultrasonic dispersing machine or the like. The stirring and mixing can be performed by a typical stirrer provided with stirring blades, a magnetic stirrer, a high-speed dispersing machine or the like.

Further, after dispersing or dissolving, the dispersion liquid or solution may be subjected to filtration under reduced pressure, filtration under application of pressure, or centrifugal separation with a centrifugal separator to remove coarse particles, foreign matters (dirt, dust) and the like, and when required, may be subjected to deaeration.

Physical Properties of Inkjet Recording Ink

The physical properties of the inkjet recording ink of the present invention may be suitably selected in accordance with the intended use. For example, the viscosity, surface tension and pH of the inkjet recording ink are preferably within the following ranges.

Viscosity

The viscosity of the inkjet recording ink may be suitably selected in accordance with the intended use. The viscosity of the inkjet recording ink, at 25° C., is preferably 3 mPa·s to 20 mPa·s, more preferably 5 mPa·s to 20 mPa·s, still more preferably 5 mPa·s to 12 mPa·s, and particularly preferably 5 mPa·s to 10 mPa·s. When the viscosity is lower or higher than the above-mentioned range, it may be difficult to ensure the discharge stability.

Surface Tension

The static surface tension of the inkjet recording ink may be suitably selected in accordance with the intended use. It is preferably 30 mN/m or less at 25° C. more preferably, 25 mN/m or less at 25° C. When the static surface tension exceeds 30 mN/m, the ink does not sufficiently permeate to paper, and it may take a long time to dry.

pH

The pH may be suitably selected in accordance with the intended use. It is, however, preferably 7 to 10, more preferably 7 to 9.5 and most preferably 7 to 9.0.

Average Particle Diameter

The average particle diameter of the inkjet recording ink may be suitably selected in accordance with the intended use. It is, however, preferably 0.02 μm to 0.18 μm, and more preferably 0.05 μm to 0.15 μm.

As described below, the inkjet recording ink of the present invention may also be suitably used in printers loaded with any of inkjet recording heads such as a so-called piezoelectric type inkjet head, in which a piezoelectric element is used as a pressure generation unit configured to pressurize an ink in an ink flow path to deform a diaphragm forming the wall surface of the ink flow path and to change the internal volume of the ink flow path, thereby discharging ink droplets (Japanese Patent Application Laid-Open (see JP-A) No. 02-51734), a so-called thermal type inkjet head in which an ink is heated in an ink flow path using a heat generating resistor to generate air bubbles (see Japanese Patent Application Laid-Open (JP-A) No. 61-59911), and an electrostatic type inkjet head in which a diaphragm forming the wall surface of an ink flow path and electrodes are disposed to face each other, and the diaphragm is deformed by an electrostatic force generated between the diaphragm and the electrodes to change the internal volume of the ink flow path, thereby discharging ink droplets (see Japanese Patent Application Laid-Open (JP-A) No. 06-71882).

The inkjet recording ink of the present invention can be suitably used in various fields, and in image forming apparatuses (printers, etc.) employing an inkjet recording method. For example, the inkjet recording ink of the present invention can also be used in printers having a function of heating a recording paper sheet or the inkjet recording ink at 50° C. to 200° C. during printing or before/after printing to accelerate print fixing, and can be particularly suitably used for the following ink cartridge, ink recorded matter, inkjet recording apparatus and inkjet recording method of the present invention.

Inkjet Recording Ink Set

An inkjet recording ink set according to the present invention includes a black ink where the colorant is black in the inkjet recording ink, and at least one colored ink where the colorant is a color.

Colors of the color inks are not particularly limited and may be suitably selected in accordance with the intended use. For example, yellow, magenta, cyan and black are exemplified. When recording is performed using an inkjet recording ink set using two or more of these colors in combination, a multi-color image may be formed, and when recording is performed using an inkjet recording ink set using all the colors in combination, a full color image may be formed.

Ink Cartridge

An ink cartridge according to the present invention houses the inkjet recording ink of the present invention in a container and further has other members suitably selected in accordance with the intended use.

The shape, structure, size, and material of the container may be suitably selected for its intended use. For example, a container having at least an ink bag formed of an aluminum laminate film, a resin film or the like is preferably exemplified.

Figure 2:
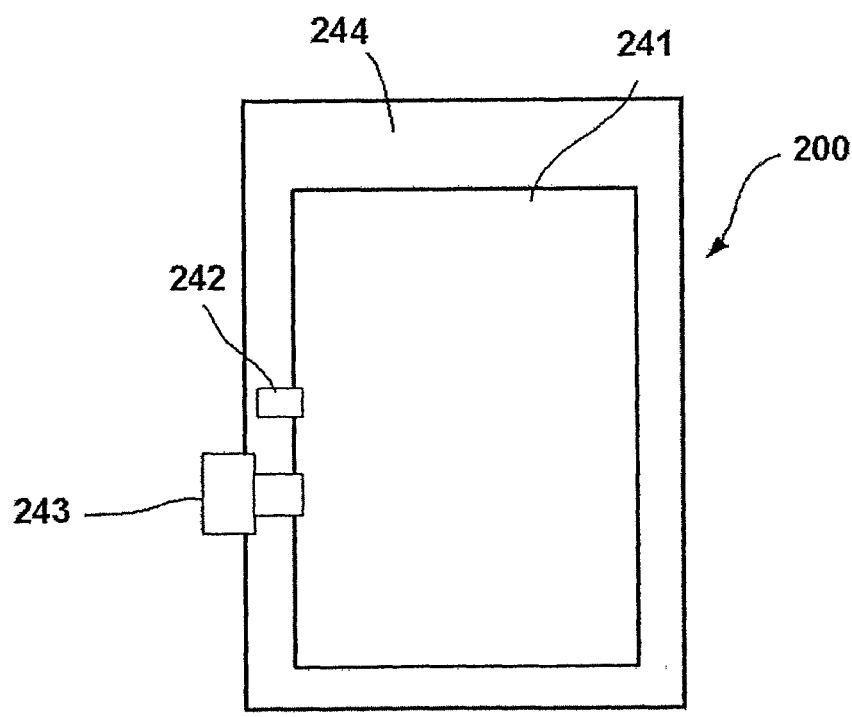
FIG. 2 is a schematic diagram of the ink cartridge in FIG. 1, including a case (exterior) of the ink cartridge.

Next, the ink cartridge will be described with reference to FIGS. 1 and 2. FIG. 1 is a diagram illustrating one example of an ink cartridge according to the present invention. FIG. 2 is a diagram of the ink cartridge in FIG. 1, including a case (exterior) of the ink cartridge.

As illustrated in FIG. 1, in an ink cartridge 200, an ink is poured from an ink inlet 242 into an ink bag 241, and the ink inlet 242 was closed by fusing the inlet after the air is discharged. In use of the ink cartridge 200, a needle fixed in the body of the printing apparatus is stuck into ink outlet 243 which is made of a rubber member to thereby supply the ink to the printing apparatus.

Typically, the ink bag 241 is formed using a wrapping member such as aluminum laminate film which is not gas transmissive. The ink bag 241, as illustrated in FIG. 2, is typically housed in plastic cartridge case 244 and is to be detachably equipped with various inkjet recording apparatuses for use.

The inkjet cartridge of the present invention may be detachably mounted to various inkjet recording apparatuses. Further, it is particularly preferable that the inkjet cartridge be detachably mounted to the inkjet recording apparatus of the present invention which will be described hereinafter.

Inkjet Recording Apparatus and Inkjet Recording Method

The inkjet recording apparatus of the present invention is provided with an ink discharge unit and is further provided with other units suitably selected in accordance with the necessity, for example, an impulse generating unit, and a controlling unit.

The inkjet recording method of the present invention includes discharging an ink from a nozzle and further includes other steps suitably selected in accordance with the necessity, for example, generating an impulse, and controlling.

The inkjet recording method of the present invention may be favorably carried out using the inkjet recording apparatus of the present invention, and the discharge of the ink may be favorably performed using the ink discharge unit. The other steps may be favorably performed using other units.

Hereinafter, the inkjet recording method will be described together with description of the inkjet recording apparatus of the present invention.

Ink Discharge and Ink Discharge Unit

According to the invention, an image is formed by discharging an ink through a nozzle and directing the discharged ink onto a substrate to form an image. The discharge may be effected by giving an impulse to the inkjet recording ink of the present invention.

The inkjet recording ink or the ink cartridge may be the ink cartridge according to the invention as described above.

The ink discharge unit is configured to discharge the recording ink by giving an impulse to the inkjet recording ink set of the present invention.

The ink discharge unit may be suitably selected in accordance with the intended use. Examples thereof include continuous jetting type and on-demand type. Examples of the on-demand type ink discharge unit include piezoelectric type, thermal type, and electrostatic type. Among these, piezoelectric types and thermal types are particularly preferable.

Specifically, the ink discharge unit preferably includes a liquid chamber, a fluid resistor, a diaphragm, and a nozzle section. At least a part of the liquid chamber, fluid resistor, diaphragm and nozzle section is preferably formed of a material containing at least one of silicone and nickel.

The nozzle diameter of the inkjet nozzle is preferably 30 ∎ m or smaller, and more preferably 1 ∎ m to 20 ∎ m.

Impulse Generating Unit

The impulse can be generated, for example, by means of the impulse generating unit, and the impulse may be suitably selected in accordance with the intended use, and examples thereof include heat (temperature), pressure, vibration, and light. These impulses may be used alone or in combination of two or more. Of these, heat and pressure are preferably used.

Examples of the impulse generating unit include heaters, pressurizing devices, piezoelectric elements, vibration generators, ultra-sonic oscillators, and light. Specific examples of the impulse generating unit include piezoelectric actuators such as piezoelectric elements; thermal actuator utilizing phase changes attributable to film boiling of the liquid by using an electric heat exchanger element such as exothermic resistor, shape-memorizing alloy actuators using metal phase changes attributable to temperature change, and an electrostatic actuator using electrostatic force.

The mechanism for discharge of the inkjet recording ink may differ depending on the type of the impulse. For example, when the impulse is from heat, there is a method in which a heat energy in accordance with a recording signal is given to the inkjet recording ink in the recording head by using, for example, a thermal head to generate air bubbles in the inkjet recording ink by means of the effect of the heat energy and to thereby eject and spray the inkjet recording ink as droplets from a nozzle hole of the recording head by means of the effect of the pressure of the air bubbles. When the impulse is from pressure, for example, there is a method in which a pressure is applied to a piezoelectric element which is bonded to the position called as a piezoelectric chamber residing in the flow path within the recording head to make the piezoelectric element bend to shrink the inner volume of the piezoelectric chamber and to thereby eject and spray the inkjet recording ink as droplets.

The size of droplets of the inkjet recording ink discharged is preferably, for example, 3 pl to 40 pl, the ejecting and spraying speed is preferably set at 5 m/s to 20 m/s, the drive frequency is preferably set at 1 kHz or more, and the resolution is preferably set at 300 dpi or more.

The controlling unit may be suitably selected in accordance with the intended use, and examples thereof include machines such as sequencers, and computers.

Figure 3:
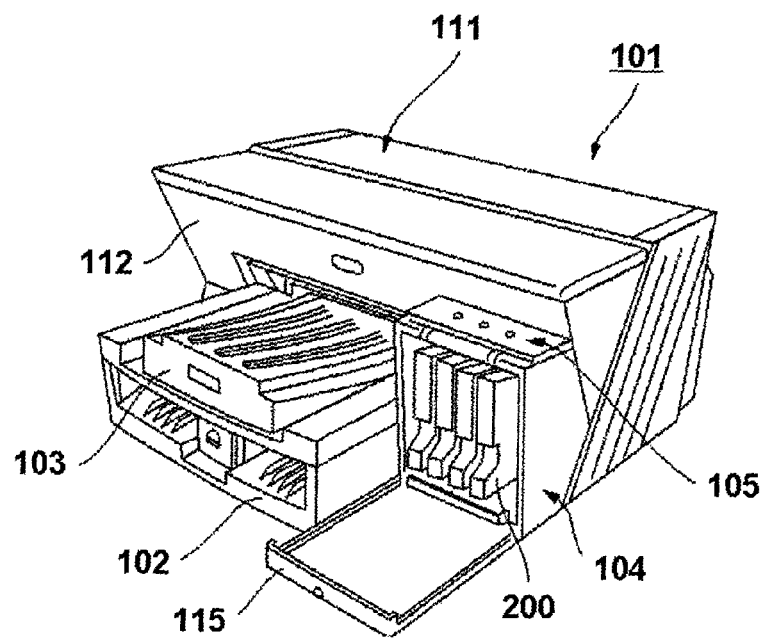
FIG. 3 is a perspective diagram illustrating a state of an inkjet recording apparatus, in which a cover of an ink cartridge loading part is open.

An aspect of carrying out the inkjet recording method of the present invention through the inkjet recording apparatus of the present invention will be described below, with reference to the drawings. An inkjet recording apparatus illustrated in FIG. 3 has an apparatus body 101, a top cover 111 on the apparatus body 101, a paper feed tray 102 to feed paper loaded into the apparatus body 101 at a whole surface 112, a paper ejection tray 103 to stock paper which is loaded into the apparatus body 101 and on which an image is recorded (formed), and an ink cartridge loading section 104.

On the top face of the ink cartridge loading section 104, an operation section 105, such as operation keys and an indicator, is arranged. The ink cartridge loading section 104 has an openable and closable front cover 115 to remove and load an ink cartridge 200.

Figure 4:
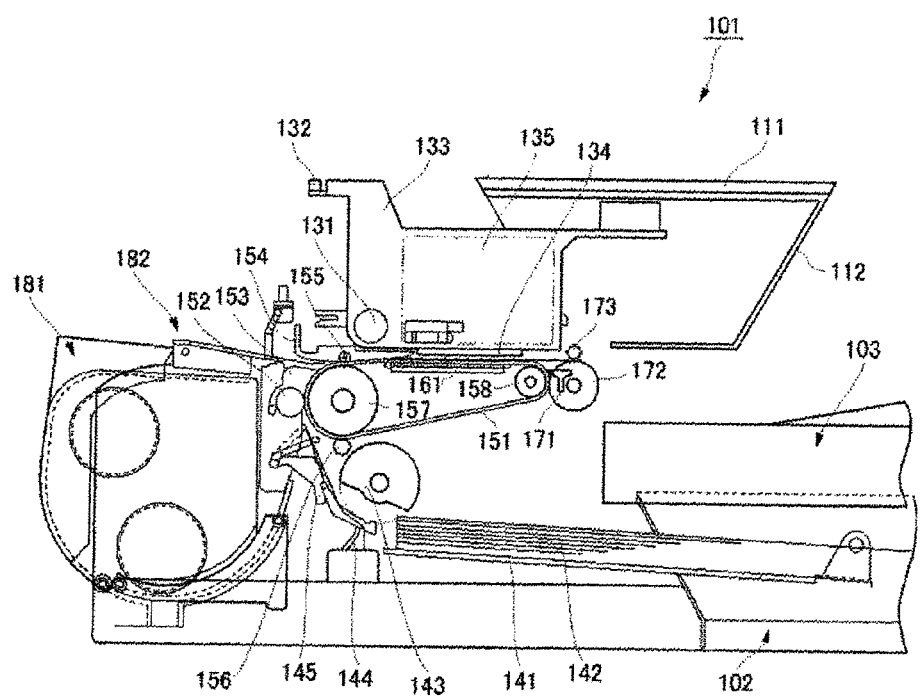
FIG. 4 is a schematic block diagram illustrating the overall structure of an inkjet recording apparatus.
Figure 5:
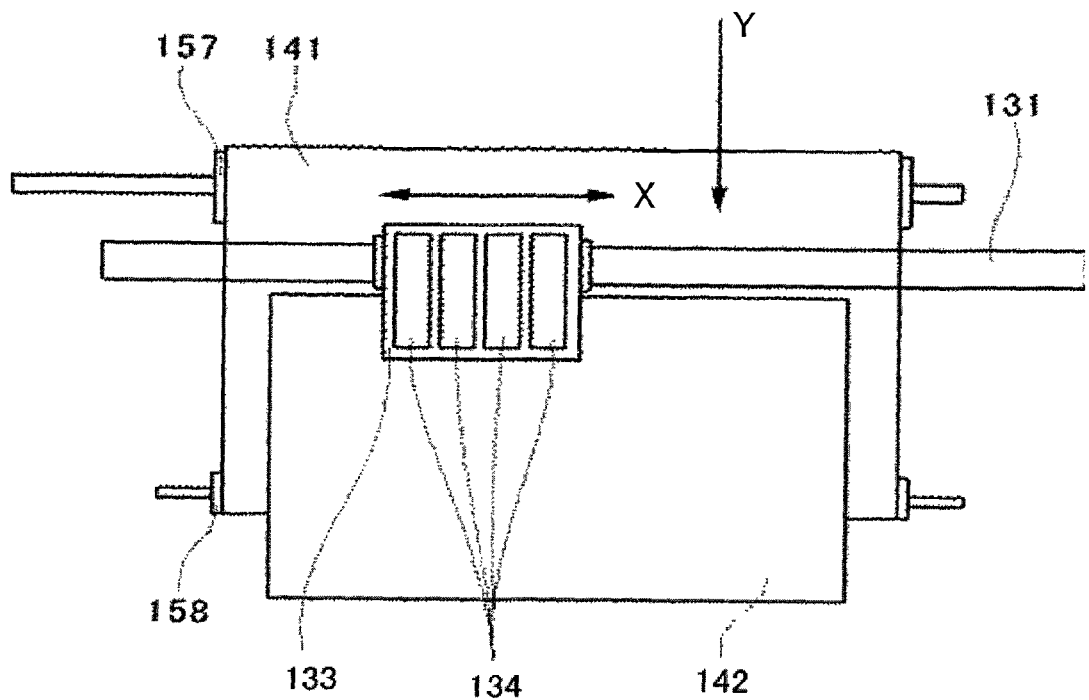
FIG. 5 is a schematic enlarged diagram illustrating one example of an inkjet head according to the present invention.

In the apparatus body 101, as illustrated in FIGS. 4 and 5, a carriage 133 is held free of sliding in the main scanning direction by a guide rod 131 and a stay 132, which are guide members laid across on lateral plates (not illustrated). Scanning is performed by a main scanning motor (not illustrated) in the direction indicated by X in FIG. 5.

In the carriage 133, a recording head 134 including four inkjet recording heads which discharge recording ink drops for respective colors, yellow (Y), cyan (C), magenta (M), and black (Bk) is loaded, so that a plurality of ink discharge openings is arranged in the direction crossing the main scanning direction, and ink drop discharge direction is headed below.

As the inkjet recording head constructing the recording head 134, an inkjet recording head which includes a piezoelectric actuator such as a piezoelectric device, a thermal actuator which utilizes phase change due to film boiling of liquid by using an electrothermal conversion device such as a heating resistive element, a memory metal actuator which uses metal phase change due to temperature change, an electrostatic actuator which uses electrostatic power or the like as a measure for generating energy to discharge the recording ink can be used.

Further, the carriage 133 is provided with a sub tank 135 for each color to supply ink for each color to the recording head 134. The sub tank 135 is supplied and refilled with the recording ink of the present invention from the ink cartridge 200 which is loaded in the ink cartridge loading section 104 via a recording ink supply tube (not illustrated).

Meanwhile, as a paper feed part to feed paper 142 laded on a paper lading section (pressure plate) 141 of the paper feed tray 102, there are provided a semilunar roller (paper feed roller 143) which separately feed the paper 142 piece by piece from the paper lading section 141 and a separation pad 144 made of a material having a large friction coefficient, which faces the paper feed roller 143. This separation pad 144 is fixed to the paper feed roller 143 side.

As a conveyance part to convey the paper 142 fed from this paper feed part below the recording head 134, a conveyance belt 151 to electrostatically absorb and convey the paper 142, a counter roller 152 to carry the paper 142 fed from the paper feed part through a guide 145 by sandwiching the paper 142 between the counter roller 152 and the conveyance belt 151, a conveyance guide 153 to change the direction of the paper 142 fed approximately vertically over the paper feed part at an angle of about 90°, and let the paper 142 be taken along the conveyance belt 151, and an end pressure roller 155 fixed to the conveyance belt 151 side by a pressure member 154 are provided. Further, a charging roller 156 which is an electrification measure to charge a surface of the conveyance belt 151 is provided.

The conveyance belt 151 is an endless belt. The conveyance belt 151 is stretched between a conveyance roller 157 and a tension roller 158, and can go around in the direction indicated by Y. This conveyance belt 151 has a surface layer formed of a resin material (with no resistance control) having a thickness of about 40 μm, for example, for example, a tetrafluoroethylene-ethylene copolymer (ETFE) and serving as a paper absorbing surface, and a back layer (medium resistance layer, grounding layer) provided with resistance control by carbon, which is the same material as used in the surface layer. A guide member 161 corresponding to a printing region by the recording head 134 is arranged on the rear side of the conveyance belt 151. As a paper ejection part to eject the paper 142 recorded by the recording head 134, a separation claw 171 to separate the paper 142 from the conveyance belt 151, a paper ejection roller 172, and a paper ejection roller 173 are provided, and the paper ejection tray 103 is arranged below the paper ejection roller 172.

A double-sided paper feed unit 181 is detachably loaded on the rear face part of the apparatus body 101. The double-sided paper feed unit 181 takes in the paper 142 returned by backward rotation of the conveyance belt 151, inverts the paper 142, and feeds the paper 142 again between the counter roller 152 and the conveyance belt 151. A manual paper feed section 182 is provided on the top face of the double-sided paper feed unit 181.

Inkjet Recording Method

In this inkjet recording apparatus, the paper 142 is separately fed piece by piece from the paper feed part. Then, the paper 142 fed approximately vertically over the paper feed part is guided by the guide 145, and conveyed by being sandwiched between the conveyance belt 151 and the counter roller 152. Further, an end of the paper 142 is guided by the conveyance guide 153, and is pressed onto the conveyance belt 151 by the end pressure roller 155. Then, the conveyance direction of the paper 142 is changed at an angle of about 90°.

At this time, the conveyance belt 157 is charged by the charging roller 156, and therefore, the paper 142 is conveyed in the state where the paper 142 is electrostatically absorbed by the conveyance belt 151. By driving the recording head 134 correspondingly to image signals while moving the carriage 133, ink drops are discharged to the stopped paper 142 and one line is recorded. After the paper 142 is carried in a given amount, the next line is recorded. When a recording finish signal or a signal that a back end of the paper 142 reaches the recording region is received, recording operation is finished, and the paper 142 is ejected to the paper ejection tray 103.

When remaining amount near end of the recording ink inside the sub tank 135 is detected, a necessary amount of the recording ink is resupplied from the ink cartridge 200 to the sub tank 135.

In this inkjet recording apparatus, when the recording ink in the ink cartridge 200 is used up, it is possible to disassemble the housing in the ink cartridge 200 and replace only the interior ink bag. Further, the ink cartridge 200 can supply the recording ink stably even when the ink cartridge 200 is placed vertically and has a front loading construction.

Therefore, even when the installation is made in the state where a space over the top face of the apparatus body 101 is blocked off, for example, when the apparatus body 101 is housed in a rack, or objects are laid on the top face of the apparatus body 101, the ink cartridge 200 can be easily replaced.

Here, descriptions have been given for the case where the present invention is applied to a serial type (shuttle type) inkjet recording apparatus in which carriage performs scanning. However, the present invention can be similarly applied to a line type inkjet recording apparatus provided with a line type head.

The inkjet recording apparatus and the inkjet recording method of the present invention can be suitably used in various recording apparatuses employing an inkjet recording method, for example, they can be particularly used in an inkjet recording printer, a facsimile, a copier, a printer/facsimile/copier complex machine.

When an image is recorded on a recording medium using the inkjet recording apparatus of the present invention which houses the inkjet recording ink of the present invention, an ink recorded matter can be obtained on the recording medium on an on-demand basis. Further, the inkjet recording ink can be supplied and replaced on an ink cartridge basis.

Here, the ink cartridge and the inkjet recording apparatus of the present invention will be described with reference to FIG. 6.

Figure 6:
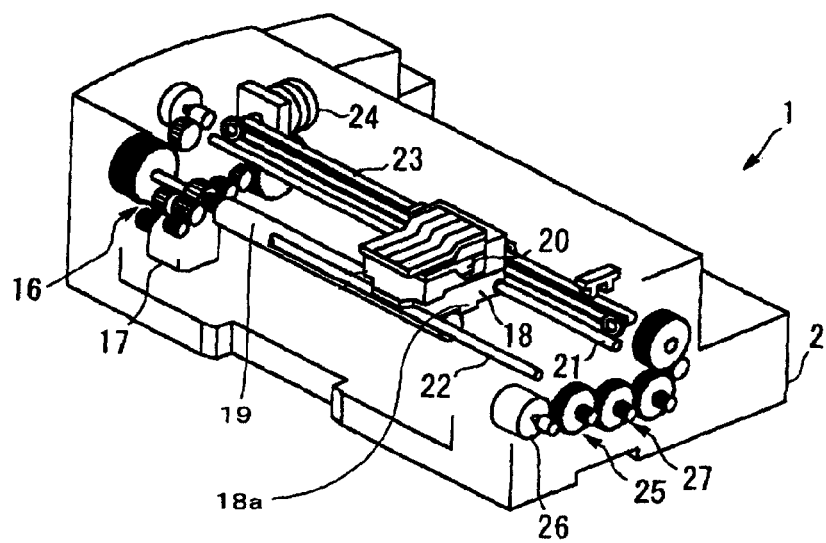
FIG. 6 is a perspective diagram illustrating one example of an inkjet recording apparatus according to the present invention.

In FIG. 6, an ink cartridge 20 in which the inkjet recording inks of the present invention are housed is housed in a carriage 18. In this embodiment, the ink cartridge 20 is provided in plural numbers for the sake of convenience, however, is not necessarily provided in plural numbers. In this state, the inkjet recording ink is supplied from the ink cartridge 20 to a liquid droplet discharge head 18a loaded on a carriage 18. Note that, in FIG. 6, the inkjet recording ink is discharged from the discharge nozzle 18a, although it cannot be seen in the figure because a discharge nozzle surface faces below.

The discharge nozzle 18a loaded on the carriage 18 is guided to move to guide shafts 21 and 22 by a timing belt 23 driven by a main scanning motor 24. Meanwhile, a special coat paper (image support) is placed at a position facing the discharge nozzle 18a by a platen 19. In FIG. 6, reference numeral 1 denotes an inkjet recording apparatus, reference numeral 2 denotes a housing, reference numeral 16 denotes a gear mechanism, reference numeral 17 denotes a subs-canning motor, reference numerals 25 and 27 each denote a gear mechanism, and reference numeral 26 denotes a main scanning motor.

Ink Recorded Matter

A ink recorded matter according to the present invention includes, on a recording medium, inkjet recording ink or an image formed using the ink cartridge of the present invention.

The recording medium is not particularly limited and may be suitably selected in accordance with the intended use. For example, both of a recording medium having absorption to ink (e.g., paper) and a recording medium having substantially no absorption to ink can be suitably used.

Examples of the recording medium include plastic sheets using, as a base material, polyethylene terephthalate, polycarbonate, polypropylene, polyethylene, polysulfone, ABS resin, and polyvinyl chloride; recording media prepared by coating a metal, for example, by vapor deposition, onto the surface of metals, such as brass, iron, aluminum, SUS, and copper, or non-metallic substrates; recording media prepared by subjecting paper as a substrate, for example, to water repellency-imparting treatment; recording media prepared by subjecting the surface of fibers, such as cloth, for example, to water repellency-imparting treatment; and recording media formed of the so-called "ceramic materials," prepared by firing inorganic materials at a high temperature. Among these recording media, paper is particularly preferable in terms of cost performance and naturalness of image.

EXAMPLES

Hereinafter, the present invention will be further described through Examples, which however shall not be construed as limiting the scope of the present invention. In the following Examples and Comparative Examples, the unit "%" means "% by mass" unless otherwise specified.

Ink Preparation Example

Ink Preparation Example 1-1

| | |
|---|---|
| cyan dispersion | 20.0% |
| 1,3-butanediol | 23.0% |
| glycerin | 8.0% |
| 2-ethyl-1,3-hexanediol | 2.0% |
| fluorine-based surfactant represented by Structural Formula (I) described below (where Rf represents $(CF_2)_4F$, X represents an integer of 2, and Y represents an integer of 2.) Structural Formula (I) | 1.0% |

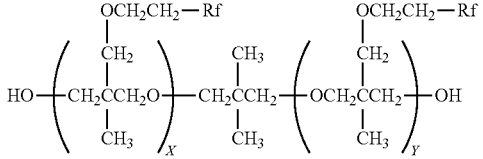

| | |
|---|---|
| PROXEL LV (antiseptic/fungicide commonly used in ink, produced by Avecia Biocides)2-amino-2-ethyl-1,3-propanediol | 0.3% |

Ion exchanged water was added as a balance so that all the ingredients added to the formulation was 100%.

Specifically, the cyan dispersion was prepared as follows. That is, with reference to Preparation Example 3 in Japanese Patent Application Laid-Open (JP-A) No. 2001-139849, first, as preparation of a polymer solution, the inside of a 1 L flask equipped with a mechanical stirrer, a thermometer, a nitrogen gas inlet tube, a reflux tube and a dropping funnel was sufficiently purged with nitrogen gas. Thereafter, the flask was charged with styrene (11.2 g), acrylic acid (2.8 g), lauryl methacrylate (12.0 g), polyethylene glycol methacrylate (4.0 g), styrene macromer (produced by TOAGOSEI Co., Ltd., trade name: AS-6) (4.0 g) and mercaptoethanol (0.4 g), and the ingredients were increased in temperature to 65° C. Next, a mixture solution of styrene (100.8 g), acrylic acid (25.2 g), lauryl methacrylate (108.0 g), polyethylene glycol methacrylate (36.0 g), hydroxyethyl methacrylate (60.0 g), styrene macromer (produced by TOAGOSEI Co., Ltd., trade name: AS-6) (36.0 g), mercaptoethanol (3.6 g), azobis dimethyl valeronitrile (2.4 g) and methylethylketone (18 g) was added dropwise into the flask over 2.5 hours.

After the dropping was finished, a mixture solution of azobis dimethyl valeronitrile (0.8 g) and methylethylketone (18 g) was added dropwise into the flask over 0.5 hours. After the mixture was aged at 65° C. for 1 hour, azobis dimethyl valeronitrile (0.8 g) was added thereto, and the mixture was further aged for 1 hour. Upon completion of the reaction, methylethylketone (364 g) was added to the flask to obtain 800 g of a polymer solution having a concentration of 50%. Subsequently, a part of the polymer solution was dried and subjected to measurement by Gel Permeation Chromatography (standard: polystyrene, solvent: tetrahydrofuran), and was found to have a weight average molecular weight of 15,000.

The resulting polymer solution (28 g), a copper phthalocyanine pigment (26 g), 1 mol/L potassium hydroxide aqueous solution (13.6 g), methylethylketone (20 g) and ion exchanged water (30 g) were sufficiently stirred. Subsequently, the mixture was kneaded 20 times using a triple roll mill (manufactured by Noritake Co., Ltd., trade name: NR-84A). The resulting paste was charged to ion exchanged water (200 g), sufficiently stirred, and then methylethylketone and water were distilled away using an evaporator to thereby obtain 160 g of a blue polymer fine particle dispersion having a solid content of 20.0 wt %.

The polymer fine particles were measured by MICROTRACK UPA and found to have an average particle diameter (D50%) of 98 nm (the same applied to the cyan dispersions described below).

Ink Preparation Example 1-2

| | |
|---|---|
| magenta dispersion | 20.0% |
| 1,3-butanediol | 22.5% |
| glycerin | 9.0% |
| 2-ethyl-1,3- hexanediol | 2.0% |
| fluorine-based surfactant represented by Structural Formula (I) described above (where Rf represents $(CF_2)_4F$, X represents an integer of 2, and Y represents an integer of 2.) | 1.0% |
| PROXEL LV | 0.2% |
| 2-amino-2-ethyl-1,3-propanediol | 0.3% |

Ion exchanged water was added as a balance so that all the ingredients added to the formulation was 100%.

Here, the magenta dispersion was prepared as follows. That is, the procedure of Preparation Example 1-1 was repeated in the same manner, except that the copper phthalocyanine pigment of Preparation Example 1-1 was changed to Pigment Red 122, to thereby obtain a reddish violet polymer fine particle dispersion. The polymer fine particles were measured by MICROTRACK UPA and found to have an average particle diameter (D50%) of 124 nm (the same applied to the magenta dispersions described below).

Ink Preparation Example 1-3

| | |
|---|---|
| yellow dispersion | 20.0% |
| 1,6-hexanediol | 24.5% |
| glycerin | 8.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.5% |
| PROXEL LV | 0.2% |
| 2-amino-2-ethyl-1,3-propanediol | 0.3% |

Ion exchanged water was added as a balance so that all the ingredients added to the formulation was 100%.

Here, the yellow dispersion was prepared as follows. That is, the procedure of Preparation Example 1-1 was repeated in the same manner, except that the copper phthalocyanine pigment of Preparation Example 1-1 was changed to Pigment Yellow 74, to thereby obtain a yellow polymer fine particle dispersion. The polymer fine particles were measured by MICROTRACK UPA and found to have an average particle diameter (D50%) of 78 nm (the same applied to the magenta dispersions described below).

Ink Preparation Example 1-4

| | |
|---|---|
| black dispersion | 20.0% |
| 1,5-pentanediol | 22.5% |
| glycerin | 7.5% |
| 2-pyrrolidone | 2.0% |
| 2-ethyl-1,3-hexanediol | 2.0% |
| R—$(OCH_2CH2)_n$OH (where R = C12, n = 9, provided that R may also be branched) | |
| fluorine-based surfactant represented by Structural Formula (I) described above (where Rf represents $(CF_2)_4F$, X represents an integer of 2, and Y represents an integer of 2.) | 0.1% |
| PROXEL LV | 0.2% |
| 2-amino-2-ethyl-1,3-propanediol | 0.5% |

Ion exchanged water was added as a balance so that all the ingredients added to the formulation was 100%.

Here, the black dispersion was prepared as follows. That is, the procedure of Preparation Example 1-1 was repeated in the same manner, except that the copper phthalocyanine pigment of Preparation Example 1-1 was changed to a carbon black (FW 100, produced by Degussa HULS AG) to thereby obtain a black polymer fine particle dispersion. The polymer fine particles were measured by MICROTRACK UPA and found to have an average particle diameter (D50%) of 110 nm (the same applied to the magenta dispersions described below).

Ink Preparation Example 1-5

| | |
|---|---|
| cyan dispersion (the same one as in Ink Preparation Example 1-1) | 20.0% |
| 3-methyl-1,3-butanediol | 10.0% |
| hexylene glycol | 4.0% |
| glycerin | 8.0% |
| 2-ethyl- 1,3-hexanediol | 2.0% |
| fluorine-based surfactant represented by Structural Formula (I) described above (where Rf represents $(CF_2)_4F$, X represents an integer of 2, and Y represents an integer of 2.) | 0.5% |
| PROXEL LV | 0.2% |
| 2-amino-2-ethyl-1,3-propanediol | 0.5% |

Ion exchanged water was added as a balance so that all the ingredients added to the formulation was 100%.

Ink Preparation Example 1-6

| | |
|---|---|
| magenta dispersion (the same one as in Ink Preparation Example 1-2) | 20.0% |
| 3-methyl-1,3-butanediol | 11.5% |
| ethylene glycol | 5.0% |
| glycerin | 7.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.5% |

| | |
|---|---|
| PROXEL LV | 0.2% |
| 2-amino-2-ethyl-1,3-propanediol | 0.3% |

Ion exchanged water was added as a balance so that all the ingredients added to the formulation was 100%.

Ink Preparation Example 1-7

| | |
|---|---|
| yellow dispersion (the same one as in Ink Preparation Example 1-3) | 20.0% |
| 3-methyl-1,3-butanediol | 20.0% |
| 1,3-butanediol | 8.5% |
| glycerin | 7.5% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.5% |
| PROXEL LV | 0.2% |
| 1-methylamino-2,3-propanediol | 0.1% |

Ion exchanged water was added as a balance so that all the ingredients added to the formulation was 100%.

Ink Preparation Example 1-8

| | |
|---|---|
| black dispersion (the same one as in Ink Preparation Example 1-4) | 20.0% |
| 2-methyl-2,4-pentanediol | 11.5% |
| 3-methyl 1,3-butanediol | 13.0% |
| glycerin | 7.5% |
| 2-pyrrolidone | 2.0% |
| UNISAFE A-LY (produced by NOF CORPORATION) | 2.0% |
| fluorine-based surfactant represented by Structural Formula (I) described above (where Rf represents $(CF_2)_4F$, X represents an integer of 2, and Y represents an integer of 2.) | 0.5% |
| 2,2,4-trimethyl-1,3-pentanediol | 2.0% |
| PROXEL LV | 0.2% |
| 1-methylamino-2,3-propanediol | 0.1% |

Ion exchanged water was added as a balance so that all the ingredients added to the formulation was 100%.
* (UNISAFE A-LY (polyester-based nonionic surfactant, produced by NOF CORPORATION)

Ink Preparation Example 1-9

| | |
|---|---|
| cyan dispersion (the same one as in Ink Preparation Example 1-1) | 20.0% |
| 3-methyl-1,5-pentanediol | 10.5% |
| 3-methyl-1,3-butanediol | 13.0% |
| glycerin | 8.0% |
| 2,2,4-trimethyl-1,3-pentanediol | 2.0% |
| UNISAFE A-LM (produced by NOF CORPORATION) | 2.0% |
| fluorine-based surfactant represented by Structural Formula (I) described above (where Rf represents $(CF_2)_4F$, X represents an integer of 2, and Y represents an integer of 2.) | 0.5% |
| PROXEL LV | 0.2% |
| 2-amino-2-ethyl-1,3-propanediol | 0.5% |

Ion exchanged water was added as a balance so that all the ingredients added to the formulation was 100%.

Ink Preparation Example 1-10

| | |
|---|---|
| magenta dispersion (the same one as in Ink Preparation Example 1-2) | 20.0% |
| 3-methyl-1,5-pentanediol | 5.0% |
| 3-methyl-1,3-butanediol | 5.0% |
| glycerin | 10.0% |
| 2,2,4-trimethyl-1,3-pentanediol | 2.0% |
| fluorine-based surfactant represented by Structural Formula (I) described above (where Rf represents $(CF_2)_4F$, X represents an integer of 2, and Y represents an integer of 2.) | 0.1% |
| ECTD-3NEX (produced by Nikko Chemicals Co., Ltd.) | 0.2% |
| 2-amino-2-ethyl-1,3-propanediol | 0.5% |

Ion exchanged water was added as a balance so that all the ingredients added to the formulation was 100%.
* (ECTD-3NEX; a surfactant of sodium polyoxyethylene tridecyl ether acetate produced by Nikko Chemicals Co., Ltd.)

Ink Preparation Example 1-11

| | |
|---|---|
| yellow dispersion (the same one as in Ink Preparation Example 1-3) | 20.0% |
| 3-methyl-1,5-pentanediol | 12.5% |
| 3-methyl-1,3-butanediol | 15.0% |
| glycerin | 7.0% |
| 2,2,4-trimethyl-1,3-pentanediol | 2.0% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.2% |
| 2-amino-2-ethyl-1,3-propanediol | 0.5% |

Ion exchanged water was added as a balance so that all the ingredients added to the formulation was 100%.

Ink Preparation Example 1-12

| | |
|---|---|
| black dispersion (the same one as in Ink Preparation Example 1-4) | 20.0% |
| 3-methyl-1,3-butanediol | 22.5% |
| glycerin | 7.5% |
| 2-pyrrolidone | 2.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.5% |
| PROXEL LV | 0.2% |
| 2-amino-2-ethyl-1,3-propanediol | 0.5% |

Ink Preparation Example 1-13

| | |
|---|---|
| cyan dispersion (the same one as in Ink Preparation Example 1-1) | 20.0% |
| 1,3-butanediol | 23.0% |
| glycerin | 8.0% |
| 2-ethyl-1,3-hexanediol | 2.0% |
| ECTD-3NEX (produced by Nikko Chemicals Co., Ltd.) | 1.0% |
| PROXEL LV | 0.2% |
| 2-amino-2-ethyl-1,3-propanediol | 0.3% |

Ion exchanged water was added as a balance so that all the ingredients added to the formulation was 100%.

Ink Preparation Example 1-14

| | |
|---|---|
| magenta dispersion (the same one as in Ink Preparation Example 1-2) | 20.0% |
| 1,3-butanediol | 22.5% |
| glycerin | 9.0% |
| 2-ethyl-1,3-hexanediol | 2.0% |
| ECTD-6NEX (a surfactant of sodium polyoxyethylene tridecyl ether acetate produced by Nikko Chemicals Co., Ltd.) | 1.0% |
| PROXEL LV | 0.2% |
| 2-amino-2-ethyl-1,3-propanediol | 0.3% |

Ion exchanged water was added as a balance so that all the ingredients added to the formulation was 100%.

Ink Preparation Example 1-15

| | |
|---|---|
| yellow dispersion (the same one as in Ink Preparation Example 1-3) | 20.0% |
| 1,6-hexanediol | 24.5% |
| glycerin | 8.0% |
| 2-ethyl-1,3-hexanediol | 2.0% |
| UNISAFE A-LY (produced by NOF CORPORATION) | 0.5% |
| PROXEL LV | 0.2% |
| 2-amino-2-ethyl-1,3-propanediol | 0.3% |

Ion exchanged water was added as a balance so that all the ingredients added to the formulation was 100%.

Ink Preparation Example 1-16

| | |
|---|---|
| black dispersion (the same one as in Ink Preparation Example 1-4) | 20.0% |
| 1,5-pentanediol | 22.5% |
| glycerin | 7.5% |
| 2-pyrrolidone | 2.0% |
| 2-ethyl-1,3-hexanediol | 2.0% |
| R—(OCH$_2$CH$_2$)$_n$OH (where R = C12, n = 9, provided that R may also be branched) Nissan Anon BL-SF (amphoteric surfactant, produced by NOF CORPORATION) | |
| PROXEL LV | 0.2% |
| 2-amino-2-ethyl-1,3-propanediol | 0.5% |

Ion exchanged water was added as a balance so that all the ingredients added to the formulation was 100%.

Ink Preparation Example 1-17

| | |
|---|---|
| cyan dispersion (the same one as in Ink Preparation Example 1-1) | 20.0% |
| 3-methyl-1,3-butanediol | 10.0% |
| hexylene glycol | 4.0% |
| glycerin | 8.0% |
| 2-ethyl-1,3-hexanediol | 2.0% |
| ECTD-3NEX (produced by Nikko Chemicals Co., Ltd.) | 0.5% |
| PROXEL LV | 0.2% |
| 2-amino-2-ethyl-1,3-propanediol | 0.5% |

Ion exchanged water was added as a balance so that all the ingredients added to the formulation was 100%.

Ink Preparation Example 1-18

| | |
|---|---|
| magenta dispersion (the same one as in Ink Preparation Example 1-2) | 20.0% |
| 3-methyl-1,3-butanediol | 11.5% |
| ethylene glycol | 5.0% |
| glycerin | 7.0% |
| 2-ethyl-1,3-hexanediol | 2.0% |
| ECTD-3NEX (produced by Nikko Chemicals Co., Ltd.) | 0.5% |
| PROXEL LV | 0.2% |
| 2-amino-2-ethyl-1,3-propanediol | 0.3% |

Ion exchanged water was added as a balance so that all the ingredients added to the formulation was 100%.

Ink Preparation Example 1-19

| | |
|---|---|
| yellow dispersion (the same one as in Ink Preparation Example 1-3) | 20.0% |
| 3-methyl-1,5-pentanediol | 12.5% |
| 3-methyl-1,3-butanediol | 15.0% |
| glycerin | 7.0% |
| 2,2,4-trimethyl-1,3-pentanediol | 2.0% |
| UNISAFE A-LY (produced by NOF CORPORATION) | 0.1% |
| PROXEL LV | 0.2% |
| 2-amino-2-ethyl-1,3-propanediol | 0.5% |

Ion exchanged water was added as a balance so that all the ingredients added to the formulation was 100%.

Ink Preparation Example 1-20

| | |
|---|---|
| black dispersion (the same one as in Ink Preparation Example 1-4) | 20.0% |
| 3-methyl-1,3-butanediol | 22.5% |
| glycerin | 7.5% |
| 2-pyrrolidone | 2.0% |

| | |
|---|---|
| 2-ethyl-1,3-hexanediol | 2.0% |
| NISSAN ANON BL-SE (amphoteric surfactant, produced by NOF CORPORATION) | 0.5% |
| PROXEL LV | 0.2% |
| 2-amino-2-ethyl-1,3-propanediol | 0.5% |

Ion exchanged water was added as a balance so that all the ingredients added to the formulation was 100%.

Ink Preparation Example 1-21

| | |
|---|---|
| cyan dispersion (the same one as in Ink Preparation Example 1-1) | 20.0% |
| 1,3-butanediol | 23.0% |
| glycerin | 8.0% |
| 2-ethyl-1,3-hexanediol | 2.0% |
| fluorine-based surfactant represented by Structural Formula (II) described below (where Rf represents $CF_2CF_3$, n represents an integer of 4, m represents an integer of 21, and p represents an integer of 4.) | 1.0% |

Structural Formula (II)

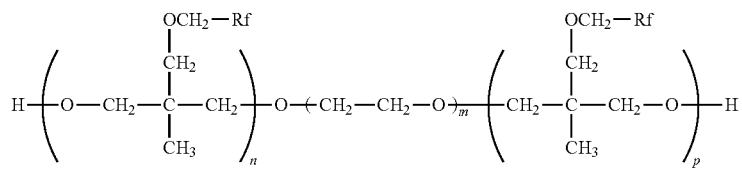

| | |
|---|---|
| PROXEL LV | 0.2% |
| 2-amino-2-ethyl-1,3-propanediol | 0.3% |

Ion exchanged water was added as a balance so that all the ingredients added to the formulation was 100%.

Ink Preparation Example 1.22

| | |
|---|---|
| magenta dispersion (the same one as in Ink Preparation Example 1-2) | 20.0% |
| 1,3-butanediol | 22.5% |
| glycerin | 9.0% |
| 2-ethyl-1,3-hexanediol | 2.0% |
| fluorine-based surfactant represented by Structural Formula (II) described above (where Rf represents $CF_2CF_3$, n represents an integer of 4, m represents an integer of 21, and p represents an integer of 4.) | 1.0% |
| PROXEL LV | 0.2% |
| 2-amino-2-ethyl-1,3-propanediol | 0.3% |

Ion exchanged water was added as a balance so that all the ingredients added to the formulation was 100%.

Ink Preparation Example 1-23

| | |
|---|---|
| yellow dispersion (the same one as in Ink Preparation Example 1-3) | 20.0% |
| 1,6-hexanediol | 24.5% |
| glycerin | 8.0% |
| 2-ethyl-1,3-hexanediol | 2.0% |
| fluorine-based surfactant represented by Structural Formula (II) described above (where Rf represents $CF_2CF_3$, n represents an integer of 4, m represents an integer of 21, and p represents an integer of 4.) | 0.5% |
| PROXEL LV | 0.2% |
| 2-amino-2-ethyl-1,3-propanediol | 0.3% |

Ion exchanged water was added as a balance so that all the ingredients added to the formulation was 100%.

Ink Preparation Example 1-24

| | |
|---|---|
| black dispersion (the same one as in Ink Preparation Example 1-4) | 20.0% |
| 1,5-pentanediol | 22.5% |
| glycerin | 7.5% |
| 2-pyrrolidone | 2.0% |
| 2-ethyl-1,3-hexanediol | 2.0% |
| R—$(OCH_2CH_2)_n$OH (where R • C12, n • 9, provided that R may also be branched) | 1.0% |
| fluorine-based surfactant represented by Structural Formula (II) described above (where Rf represents $CF_2CF_3$, n represents an integer of 4, m represents an integer of 21, and p represents an integer of 4.) | 0.1% |
| PROXEL LV | 0.2% |
| 2-amino-2-ethyl-1,3-propanediol | 0.5% |

Ion exchanged water was added as a balance so that all the ingredients added to the formulation was 100%.

Examples 1-1 to 1-10, Comparative Examples 1-1 to 1-7

Next, ink cartridges of Examples 1-1 to 1-10 and Comparative Examples 1-1 to 1-7 were each prepared using the inks produced in Preparation Examples 1-1 to 1-24 in the combination shown in Table 1.

TABLE 1

| | Inkjet recording ink set | | | |
|---|---|---|---|---|
| | Cyan | Magenta | Yellow | Black |
| Ex. 1-1 | Preparation Ex. 1-1 | Preparation Ex. 1-2 | Preparation Ex. 1-3 | Preparation Ex. 1-4 |
| Ex. 1-2 | Preparation Ex. 1-5 | Preparation Ex. 1-2 | Preparation Ex. 1-3 | Preparation Ex. 1-8 |
| Ex. 1-3 | Preparation Ex. 1-9 | Preparation Ex. 1-2 | Preparation Ex. 1-7 | Preparation Ex. 1-4 |
| Ex. 1-4 | Preparation Ex. 1-1 | Preparation Ex. 1-6 | Preparation Ex. 1-7 | Preparation Ex. 1-8 |
| Ex. 1-5 | Preparation Ex. 1-5 | Preparation Ex. 1-6 | Preparation Ex. 1-11 | Preparation Ex. 1-12 |
| Ex. 1-6 | Preparation Ex. 1-9 | Preparation Ex. 1-6 | Preparation Ex. 1-11 | Preparation Ex. 1-4 |
| Ex. 1-7 | Preparation Ex. 1-1 | Preparation Ex. 1-10 | Preparation Ex. 1-11 | Preparation Ex. 1-8 |
| Ex. 1-8 | Preparation Ex. 1-5 | Preparation Ex. 1-10 | Preparation Ex. 1-7 | Preparation Ex. 1-12 |
| Ex. 1-9 | Preparation Ex. 1-9 | Preparation Ex. 1-10 | Preparation Ex. 1-3 | Preparation Ex. 1-12 |
| Ex. 1-10 | Preparation Ex. 1-1 | Preparation Ex. 1-2 | Preparation Ex. 1-11 | Preparation Ex. 1-12 |
| Comp. Ex. 1-1 | Preparation Ex. 1-13 | Preparation Ex. 1-14 | Preparation Ex. 1-15 | Preparation Ex. 1-16 |
| Comp. Ex. 1-2 | Preparation Ex. 1-17 | Preparation Ex. 1-14 | Preparation Ex. 1-19 | Preparation Ex. 1-20 |
| Comp. Ex. 1-3 | Preparation Ex. 1-13 | Preparation Ex. 1-18 | Preparation Ex. 1-19 | Preparation Ex. 1-20 |
| Comp. Ex. 1-4 | Preparation Ex. 1-17 | Preparation Ex. 1-18 | Preparation Ex. 1-15 | Preparation Ex. 1-16 |
| Comp. Ex. 1-5 | Preparation Ex. 1-21 | Preparation Ex. 1-22 | Preparation Ex. 1-23 | Preparation Ex. 1-24 |
| Comp. Ex. 1-6 | Preparation Ex. 1-1 | Preparation Ex. 1-2 | Preparation Ex. 1-3 | Preparation Ex. 1-16 |
| Comp. Ex. 1-7 | Preparation Ex. 1-5 | Preparation Ex. 1-6 | Preparation Ex. 1-15 | Preparation Ex. 1-4 |

Evaluation 1: Evaluation of Color Developing Ability (Color Saturation)

Using an inkjet printer (IPSIOG707, manufactured by Ricoh Company Ltd.) filled with each of the inkjet recording inks prepared in Examples 1-1 to 1-10 and Comparative Examples 1-1 to 1-7, printing was performed on MY PAPER (produced by Ricoh Company Ltd.). As a print pattern, each of the yellow, magenta, cyan and black inks was printed with 100% duty under the printing conditions: recording density: 360 dpi and one-pass printing.

After the print was dried, the color saturation of each color of yellow, magenta and cyan of the inkjet recording ink set was measured in monochrome solid image parts using a reflection type color spectrometry densitometer (manufactured by X-Rite), a color specification-based coordinate of L*a*b* according to the color difference specification method specified by CIE was determined, and then a saturation C* for each color was determined. It can be said that the higher the color saturation, the more excellent color developing ability the ink has.

Note that the saturation C* is defined by Equation (1) below.

$$C^* = [(a^*)^2 + (b^*)^2]^{1/2} \quad \text{Equation (1)}$$

The results are shown in Table 2.

TABLE 2

| | Result of Color Saturation | | |
|---|---|---|---|
| | Cyan | Magenta | Yellow |
| Ex. 1-1 | 52.06 | 62.53 | 81.65 |
| Ex. 1-2 | 52.22 | 62.49 | 82.02 |
| Ex. 1-3 | 52.02 | 62.55 | 82.31 |
| Ex. 1-4 | 51.98 | 62.19 | 82.69 |
| Ex. 1-5 | 52.62 | 62.53 | 82.52 |
| Ex. 1-6 | 51.87 | 62.26 | 82.38 |
| Ex. 1-7 | 52.21 | 62.75 | 82.46 |
| Ex. 1-8 | 52.30 | 62.59 | 82.42 |
| Ex. 1-9 | 52.18 | 62.55 | 81.94 |
| Ex. 1-10 | 52.16 | 62.29 | 82.71 |
| Comp. Ex. 1-1 | 48.62 | 57.07 | 76.73 |
| Comp. Ex. 1-2 | 49.11 | 58.22 | 76.68 |
| Comp. Ex. 1-3 | 48.57 | 58.14 | 76.61 |
| Comp. Ex. 1-4 | 49.23 | 57.04 | 76.60 |
| Comp. Ex. 1-5 | 50.17 | 60.32 | 78.99 |
| Comp. Ex. 1-6 | 52.12 | 62.49 | 81.52 |
| Comp. Ex. 1-7 | 49.12 | 62.5 | 82.15 |

Evaluation 2: Evaluation Test of Foamability 10 mL of each of the inkjet recording inks prepared in Examples 1-1 to 1-10 and Comparative Examples 1-1 to 1-7 was placed in a 100 mL graduated cylinder under the environment of 25° C., and air having a certain pressure was injected to the cylinder until the volume of the ink and air bubbles was 100 mL, and the injection of air was stopped at the time when the volume of the ink and air bubbles reached 100 mL. The time passed from the start of the injection to the stop of the injection was regarded as an foaming time and evaluated based on the following criteria. Note that grade AAA, AA, A or B is within the acceptable range.

Evaluation Criteria

AAA: The foaming time was longer than 25 seconds
AA: The foaming time was 20 seconds or longer but shorter than 25 seconds.
A: The foaming time was longer than 15 seconds or longer but shorter than 20 seconds.
B: The foaming time was 10 seconds or longer but shorter than 15 seconds.
C: The foaming time was 5 seconds or longer but shorter than 10 seconds.
D: The foaming time was shorter than 5 seconds.

The results are shown in Table 3.

TABLE 3

| | Evaluation of Foamability | | | |
|---|---|---|---|---|
| | Cyan | Magenta | Yellow | Black |
| Ex. 1-1 | AA | A | AA | AAA |
| Ex. 1-2 | AAA | A | AA | A |
| Ex. 1-3 | AAA | A | AA | AAA |
| Ex. 1-4 | AA | AA | AA | A |
| Ex. 1-5 | AAA | AA | AAA | AA |
| Ex. 1-6 | AAA | AA | AAA | AAA |
| Ex. 1-7 | AA | AAA | AAA | A |
| Ex. 1-8 | AAA | AAA | AA | AA |

TABLE 3-continued

| | Evaluation of Foamability | | | |
|---|---|---|---|---|
| | Cyan | Magenta | Yellow | Black |
| Ex. 1-9 | AAA | AAA | AA | AA |
| Ex. 1-10 | AA | A | AAA | AA |
| Comp. Ex. 1-1 | C | C | C | C |
| Comp. Ex. 1-2 | C | C | C | C |
| Comp. Ex. 1-3 | D | C | D | D |
| Comp. Ex. 1-4 | C | B | C | C |
| Comp. Ex. 1-5 | A | A | A | A |
| Comp. Ex. 1-6 | A | A | A | C |
| Comp. Ex. 1-7 | A | A | C | A |

Evaluation 3: Evaluation of Discharge Stability

Using an inkjet printer (IPSIOG707, manufactured by Ricoh Company Ltd.) filled with each of the inkjet recording inks prepared in Examples 1-1 to 1-10 and Comparative Examples 1-1 to 1-7, printing was performed on MY PAPER (produced by Ricoh Company Ltd.). A chart with a print area of 5% for each color in the image area in the total area of the paper was used as a print pattern, and each of the yellow, magenta, cyan and black inks was printed with 100% duty, under the printing conditions: recording density: 360 dpi and one-pass printing.

In addition, using each of the inkjet recording ink sets of Examples 1-1 to 1-10 and Comparative Examples 1-1 to 1-7, Evaluation 1 described above was carried out, and then Evaluation 3 described below was carried out. As intermittent printing, 20 sheets of the chart were continuously printed, and then the printer was set to a paper feed state where ink discharge was not performed for 20 minutes. This operation was repeated 50 times to print 1,000 sheets in cumulative total, and then one more sheet of the same chart was printed. Then, the presence or absence of streaks, white spots and jetting disturbance in the 5% solid part of the chart at this point was visually observed, evaluated based on the following criteria. Note that grade A or B is within the acceptable range.

[Evaluation Criteria]

A: No streak, white spot and jetting disturbance was found in the solid part.

B: Streaks, white spots and jetting disturbance were slightly recognized in the solid part.

C: Streaks, white spots and jetting disturbance were recognized at the first scanning.

D: Streaks, white spots and jetting disturbance were recognized across the solid part.

The results are shown in Table 4.

TABLE 4

| | Discharge Stability |
|---|---|
| Ex. 1-1 | A |
| Ex. 1-2 | A |
| Ex. 1-3 | A |
| Ex. 1-4 | A |
| Ex. 1-5 | A |
| Ex. 1-6 | A |
| Ex. 1-7 | A |
| Ex. 1-8 | A |
| Ex. 1-9 | A |
| Ex. 1-10 | A |
| Comp. Ex. 1-1 | C |
| Comp. Ex. 1-2 | C |
| Comp. Ex. 1-3 | D |
| Comp. Ex. 1-4 | B |
| Comp. Ex. 1-5 | A |
| Comp. Ex. 1-6 | B |
| Comp. Ex. 1-7 | B |

Evaluation 4: Evaluation of Bleed Between Black and Color Inks

Using an inkjet printer (IPSIOG707, manufactured by Ricoh Company Ltd.) filled with each of the inkjet recording inks prepared in Examples 1-1 to 1-10 and Comparative Examples 1-1 to 1-7, printing was performed on MY PAPER (produced by Ricoh Company Ltd.). As a print patter, each yellow ink was printed with 100% duty.

Letters of each black ink were printed in the obtained yellow solid image part, and thereby bleed (ooze) between the yellow ink and the black ink was visually observed and evaluated based on the following evaluation criteria. Note that grade AAA, AA, A or B is within the acceptable range.

[Evaluation Criteria]

The printing conditions were set as follows: recording density: 360 dpi and one pass printing.

AAA: No color bleed was observed by visual assessment, letters of the black ink were clearly recognized.

AA: Minimal color bleed was observed by visual assessment, letters of the black ink remained clearly recognized.

A: A slight amount of color bleed was observed, however, the letters of the black ink were clearly recognized.

B: Small amount of color bleed occurred, however, letters of the black ink slightly oozed.

C: Color bleed occurred, and it was difficult to recognize letters of the black ink.

The results are shown in Table 5.

TABLE 5

| | Evaluation of Bleed |
|---|---|
| | Bleed |
| Ex. 1-1 | AA |
| Ex. 1-2 | AAA |
| Ex. 1-3 | AA |
| Ex. 1-4 | AAA |
| Ex. 1-5 | AA |
| Ex. 1-6 | AA |
| Ex. 1-7 | AAA |
| Ex. 1-8 | AA |
| Ex. 1-9 | AA |
| Ex. 1-10 | AA |
| Comp. Ex. 1-1 | C |
| Comp. Ex. 1-2 | C |
| Comp. Ex. 1-3 | B |

TABLE 5-continued

Evaluation of Bleed

| | Bleed |
|---|---|
| Comp. Ex. 1-4 | C |
| Comp. Ex. 1-5 | A |
| Comp. Ex. 1-6 | B |
| Comp. Ex. 1-7 | B |

(1) Evaluation of Color Saturation: According to the comparison between Ink Preparation Examples (1-1 to 1-7, 1-11 and 1-12) among Examples 1-1 to 1-10 and Ink Preparation Examples of Comparative Examples 1-1 to 1-5, it turns out that the color saturation can be increased by adding the specific fluorine-based surfactant represented by Structural Formula (I) in an ink.

(2) Evaluation of Color Saturation: According to the comparison between Ink Preparation Examples (1-8 to 1-10) in Examples and Ink Preparation Examples of Comparative Examples 1-1 to 1-5, it turns out that even when the fluorine-based surfactant represented by Structural Formula (I) and a different surfactant are added in the form of a mixture to an ink, the color saturation can also be increased.

(3) Verification of Foamability: According to the comparison between Ink Preparation Examples (1-1 to 1-7, 1-11, and 1-12) in Examples and Ink Preparation Examples of Comparative Examples 1-1 to 1-4, it turns out that by adding the fluorine-based surfactant represented by Structural Formula (I) in an ink, the foamability of the ink is suppressed and the ink becomes less foamable.

(4) Verification of Foamability: According to the comparison between Ink Preparation Examples (1-8 to 1-10) in Examples and Ink Preparation Examples of Comparative Examples 1-1 to 1-4, it turns out that even when the fluorine-based surfactant represented by Structural Formula (I) is mixed with other surfactants, the foamability of ink can be suppressed.

(5) Evaluation of Discharge Stability: According to the comparison between Ink Preparation Examples 1-1 to 1-10 in Examples and Ink Preparation Examples of Comparative Examples 1-1 to 1-4, it turns out that since the foamability of ink is suppressed by adding the fluorine-based surfactant represented by Structural Formula (I) in an ink, the foamability in an inkjet head is suppressed and foams hardly occur, and thus the discharge stability is ensured.

(6) Evaluation of Bleed: According to the comparison between Examples 1-1 to 1-10 and Comparative Examples 1-1 to 1-4 and 1-6 and 1-7, the vehicle rapidly penetrates to paper by adding the fluorine-based surfactant represented by Structural Formula (I) in an ink, and the color material uniformly remains on paper, and thus occurrence of bleed can be suppressed.

It turns out that when the fluorine-based surfactant represented by Structural Formula (I) is added to only a color ink or black ink, it becomes less effective in the color saturation, foamability, discharge stability and suppression of bleed; and when the fluorine-based surfactant represented by Structural Formula (I) is not added to both color inks and black ink, it is not effective to cause bleed.

Ink Preparation Example

Ink Preparation Example 2-1

After the following composition was mixed and stirred for 30 minutes, the resulting mixture was filtered off with a membrane filter having a pore diameter of 0.5 ■ m and further deaerated under vacuum to thereby prepare Cyan Ink 1.

[Composition of Cyan Ink 1]

| | |
|---|---|
| C.I. Direct Blue 199 | 2.5% |
| (PRO-JET Cyan 1 Liquid, produced by Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 2-2

After the following composition was mixed and stirred for 30 minutes, the resulting mixture was filtered off with a membrane filter having a pore diameter of 0.5 ■ m and further deaerated under vacuum to thereby prepare Magenta Ink 1.

[Composition of Magenta Ink 1]

| | |
|---|---|
| C.I. Acid Red 249 | 2.0% |
| (PRO-JET Magenta 1 Liquid, produced by Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 2-3

After the following composition was mixed and stirred for 30 minutes, the resulting mixture was filtered off with a membrane filter having a pore diameter of 0.5 ■ m and further deaerated under vacuum to thereby prepare Yellow Ink 1.

[Composition of Yellow Ink 1]

| | |
|---|---|
| C.I. Direct Yellow 132 | 2.0% |
| (BAYSCRIPT Yellow GGN Liquid, produced by LANXESS Deutschland GmbH) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 2-4

After the following composition was mixed and stirred for 30 minutes, the resulting mixture was filtered off with a membrane filter having a pore diameter of 0.5 μm and further deaerated under vacuum to thereby prepare Black Ink 1.
[Composition of Black Ink 1]

| | |
|---|---|
| C.I. Direct Black 195 | 6.0% |
| (PRO-JET Fast Black 2 Liquid, produced by | |
| Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by | 0.1% |
| Structural Formula (I) described above | |
| (where Rf represents $(CF_2)_4F$, X represents an | |
| integer of 2, and Y represents an integer of 2.) | |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 3-1

After the following composition was mixed and stirred for 30 minutes, the resulting mixture was filtered off with a membrane filter having a pore diameter of 0.5 μm and further deaerated under vacuum to thereby prepare Cyan Ink 2.
[Composition of Cyan Ink 2]

| | |
|---|---|
| C.I. Direct Blue 199 | 2.5% |
| (DAIWA IJ BLUE 319HL, produced by Daiwa Kasei | |
| Industry Co., Ltd.) | |
| ethylene glycol monobutyl ether | 9.5% |
| glycerin | 28.5% |
| 2-ethyl-1,3-hexanediol | 2.0% |
| triethanolamine | 0.5% |
| fluorine-based surfactant represented by | 0.1% |
| Structural Formula (I) described above | |
| (where Rf represents $(CF_2)_4F$, X represents an | |
| integer of 2, and Y represents an integer of 2.) | |
| PROXEL LV | 0.1% |

Ion exchanged water was added as a balance so that all the ingredients added to the formulation was 100%.

Ink Preparation Example 3-2

After the following composition was mixed and stirred for 30 minutes, the resulting mixture was filtered off with a membrane filter having a pore diameter of 0.5 μm and further deaerated under vacuum to thereby prepare Magenta Ink 2.
[Composition of Magenta Ink 2]

| | |
|---|---|
| C.I. Acid Red 249 | 2.0% |
| (PRO-JET Magenta 1 Liquid, produced by | |
| Fuji Film Imaging Colorant Corp.) | |
| ethylene glycol monobutyl ether | 9.5% |
| glycerin | 28.5% |
| 2-ethyl-1,3-hexanediol | 2.0% |
| triethanolamine | 0.5% |
| fluorine-based surfactant represented by | 0.1% |
| Structural Formula (I) described above | |
| (where Rf represents $(CF_2)_4F$, X represents an | |
| integer of 2, and Y represents an integer of 2.) | |
| PROXEL LV | 0.1% |

Ion exchanged water was added as a balance so that all the ingredients added to the formulation was 100%.

Ink Preparation Example 3-3

After the following composition was mixed and stirred for 30 minutes, the resulting mixture was filtered off with a membrane filter having a pore diameter of 0.5 μm and further deaerated under vacuum to thereby prepare Yellow Ink 2.
[Composition of Yellow Ink 2]

| | |
|---|---|
| C.I. Direct Yellow 132 | 2.0% |
| (BAYSCRIPT Yellow GGN Liquid, produced by | |
| LANXESS Deutschland GmbH) | |
| ethylene glycol monobutyl ether | 9.5% |
| glycerin | 28.5% |
| 2-ethyl-1,3-hexanediol | 2.0% |
| triethanolamine | 0.5% |
| fluorine-based surfactant represented by | 0.1% |
| Structural Formula (I) described above | |
| (where Rf represents $(CF_2)_4F$, X represents an | |
| integer of 2, and Y represents an integer of 2.) | |
| PROXEL LV | 0.1% |

Ion exchanged water was added as a balance so that all the ingredients added to the formulation was 100%.

Ink Preparation Example 3-4

After the following composition was mixed and stirred for 30 minutes, the resulting mixture was filtered off with a membrane filter having a pore diameter of 0.5 μm and further deaerated under vacuum to thereby prepare Black Ink 2.
[Composition of Black Ink 2]

| | |
|---|---|
| DUASYN Black HEF-SF Liquid | 30.0% |
| (C.I. DIRECT BLACK 168, dye concentration: | |
| 20%, produced by Clariant Japan K.K.) | |
| ethylene glycol monobutyl ether | 9.5% |
| 2-ethyl-1,3-hexanediol | 2.0% |
| triethanolamine | 0.5% |
| fluorine-based surfactant represented by | 0.1% |
| Structural Formula (I) described above | |
| (where Rf represents $(CF_2)_4F$, X represents an | |
| integer of 2, and Y represents an integer of 2.) | |
| PROXEL LV | 0.1% |

Ion exchanged water was added as a balance so that all the ingredients added to the formulation was 100%.

Ink Preparation Example 4-1

After the following composition was mixed and stirred for 30 minutes, the resulting mixture was filtered off with a membrane filter having a pore diameter of 0.5 μm and further deaerated under vacuum to thereby prepare Cyan Ink 3.
[Composition of Cyan Ink 3]

| | |
|---|---|
| C.I. Direct Blue 199 | 2.5% |
| (PRO-JET Cyan 1 Liquid, produced by | |
| Fuji Film Imaging Colorant Corp.) | |
| glycerin | 10.0% |
| 1,3-butanediol | 30.0% |
| 2-ethyl-1,3-hexanediol | 2.0% |

-continued

| | |
|---|---|
| 2-amino-2-ethyl-1,3-propanediol | 0.5% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.1% |

Ion exchanged water was added as a balance so that all the ingredients added to the formulation was 100%.

Ink Preparation Example 4-2

After the following composition was mixed and stirred for 30 minutes, the resulting mixture was filtered off with a membrane filter having a pore diameter of 0.5 μm and further deaerated under vacuum to thereby prepare Magenta Ink 3.

[Composition of Magenta Ink 3]

| | |
|---|---|
| C.I. Acid Red 249 (PRO-JET Magenta 1 Liquid, produced by Fuji Film Imaging Colorant Corp.) | 2.0% |
| glycerin | 10.0% |
| 1,3-butanediol | 30.0% |
| 2-ethyl-1,3-hexanediol | 2.0% |
| 2-amino-2-ethyl-1,3-propanediol | 0.5% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.1% |

Ion exchanged water was added as a balance so that all the ingredients added to the formulation was 100%.

Ink Preparation Example 4-3

After the following composition was mixed and stirred for 30 minutes, the resulting mixture was filtered off with a membrane filter having a pore diameter of 0.5 μm and further deaerated under vacuum to thereby prepare Yellow Ink 3.

[Composition of Yellow Ink 3]

| | |
|---|---|
| C.I. Acid Yellow 23 (Acid Yellow 23, produced by Daiwa Kasei Industry Co., Ltd.) | 2.0% |
| glycerin | 10.0% |
| 1,3-butanediol | 30.0% |
| 2-ethyl-1,3-hexanediol | 2.0% |
| 2-amino-2-ethyl-1,3-propanediol | 0.5% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.1% |

Ion exchanged water was added as a balance so that all the ingredients added to the formulation was 100%.

Ink Preparation Example 4-4

After the following composition was mixed and stirred for 30 minutes, the resulting mixture was filtered off with a membrane filter having a pore diameter of 0.5 μm and further deaerated under vacuum to thereby prepare Black Ink 3.

[Composition of Black Ink 3]

| | |
|---|---|
| DUASYN Black HEF-SF Liquid (C.I. Direct Black 168, dye concentration: 20%, produced by Clariant Japan K.K.) | 30.0% |
| glycerin | 10.0% |
| 1,3-butanediol | 30.0% |
| 2-ethyl-1,3-hexanediol | 2.0% |
| 2-amino-2-ethyl-1,3-propanediol | 0.5% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.1% |

Ion exchanged water was added as a balance so that all the ingredients added to the formulation was 100%.

Ink Preparation Example 5-1

After the following composition was mixed and stirred for 30 minutes, the resulting mixture was filtered off with a membrane filter having a pore diameter of 0.5 μm and further deaerated under vacuum to thereby prepare Cyan Ink 4.

[Composition of Cyan Ink 4]

| | |
|---|---|
| C.I. Direct Blue 199 (PRO-JET Cyan 1 Liquid, produced by Fuji Film Imaging Colorant Corp.) | 2.5% |
| glycerin | 23.0% |
| ethylene glycol monobutyl ether | 23.0% |
| 2-ethyl-1,3-hexanediol | 2.0% |
| 2-amino-2-ethyl-1,3-propanediol | 0.3% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.1% |

Ion exchanged water was added as a balance so that all the ingredients added to the formulation was 100%.

Ink Preparation Example 5-2

After the following composition was mixed and stirred for 30 minutes, the resulting mixture was filtered off with a membrane filter having a pore diameter of 0.5 μm and further deaerated under vacuum to thereby prepare Magenta Ink 4.

[Composition of Magenta Ink 4]

| | |
|---|---|
| C.I. Reactive Red 31 (PRO-JET Magenta 3B-OA Liquid, produced by Fuji Film Imaging Colorant Corp.) | 2.5% |
| glycerin | 23.0% |
| ethylene glycol monobutyl ether | 23.0% |
| 2-ethyl-1,3-hexanediol | 2.0% |
| 2-amino-2-ethyl-1,3-propanediol | 0.3% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.1% |

Ion exchanged water was added as a balance so that all the ingredients added to the formulation was 100%.

Ink Preparation Example 5-3

After the following composition was mixed and stirred for 30 minutes, the resulting mixture was filtered off with a membrane filter having a pore diameter of 0.5 ■ m and further deaerated under vacuum to thereby prepare Yellow Ink 4.
[Composition of Yellow Ink 4]

| | |
|---|---|
| C.I. Acid Yellow 23 | 2.0% |
| (Acid Yellow 23, produced by Daiwa Kasei Industry Co., Ltd.) | |
| glycerin | 23.0% |
| ethylene glycol monobutyl ether | 23.0% |
| 2-ethyl-1,3-hexanediol | 2.0% |
| 2-amino-2-ethyl-1,3-propanediol | 0.3% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.1% |

Ion exchanged water was added as a balance so that all the ingredients added to the formulation was 100%.

Ink Preparation Example 5-4

After the following composition was mixed and stirred for 30 minutes, the resulting mixture was filtered off with a membrane filter having a pore diameter of 0.5 ■ m and further deaerated under vacuum to thereby prepare Black Ink 4.
[Composition of Black Ink 4]

| | |
|---|---|
| BAYSCRIPT Black SP liquid | 20.0% |
| (dye concentration: 30%, produced by LANXESS Deutschland GmbH) | |
| glycerin | 23.0% |
| ethylene glycol monobutyl ether | 23.0% |
| 2-ethyl-1,3-hexanediol | 2.0% |
| 2-amino-2-ethyl-1,3-propanediol | 0.3% |
| fluorine-based surfactant represented by Structural Formula (I) described above (where Rf represents $(CF_2)_4F$, X represents an integer of 2, and Y represents an integer of 2.) | 0.1% |
| PROXEL LV | 0.1% |

Ion exchanged water was added as a balance so that all the ingredients added to the formulation was 100%.

Ink Preparation Example 6-1

After the following composition was mixed and stirred for 30 minutes, the resulting mixture was filtered off with a membrane filter having a pore diameter of 0.5 ■ m and further deaerated under vacuum to thereby prepare Cyan Ink 5.
[Composition of Cyan Ink 5]

| | |
|---|---|
| C.I. Direct Blue 86 | 3.0% |
| (Direct Blue 86, produced by Daiwa Kasei Industry Co., Ltd.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.01% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 6-2

After the following composition was mixed and stirred for 30 minutes, the resulting mixture was filtered off with a membrane filter having a pore diameter of 0.5 ■ m and further deaerated under vacuum to thereby prepare Magenta Ink 5.
[Composition of Magenta Ink 5]

| | |
|---|---|
| C.I. Acid Red 249 | 2.0% |
| (PRO-JET Magenta 1 Liquid, produced by Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.01% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 6-3

After the following composition was mixed and stirred for 30 minutes, the resulting mixture was filtered off with a membrane filter having a pore diameter of 0.5 ■ m and further deaerated under vacuum to thereby prepare Yellow Ink 5.
[Composition of Yellow Ink 5]

| | |
|---|---|
| C.I. Direct Yellow 132 | 2.0% |
| (BAYSCRIPT Yellow GGN Liquid, produced by LANXESS Deutschland GmbH) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.01% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 6-4

After the following composition was mixed and stirred for 30 minutes, the resulting mixture was filtered off with a membrane filter having a pore diameter of 0.5 ■ m and further deaerated under vacuum to thereby prepare Black Ink 5.
[Composition of Black Ink 5]

| | |
|---|---|
| C.I. Direct Black 195 | 6.0% |
| (PRO-JET Fast Black 2 Liquid, produced by Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.01% |
| PROXEL LV | 0.1% |
| 2-amino-2-ethyl-1,3-propanediol | 0.2% |

Ink Preparation Example 7-1

After the following composition was mixed and stirred for 30 minutes, the resulting mixture was filtered off with a membrane filter having a pore diameter of 0.5 μm and further deaerated under vacuum to thereby prepare Cyan Ink 6.

[Composition of Cyan Ink 6]

| | |
|---|---|
| C.I. Direct Blue 86 | 3.0% |
| (Direct Blue 86, produced by Daiwa Kasei Industry Co., Ltd.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 1.0% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 7-2

After the following composition was mixed and stirred for 30 minutes, the resulting mixture was filtered off with a membrane filter having a pore diameter of 0.5 μm and further deaerated under vacuum to thereby prepare Magenta Ink 6.

[Composition of Magenta Ink 6]

| | |
|---|---|
| C.I. Acid Red 249 | 2.0% |
| (PRO-JET Magenta 1 Liquid, produced by Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 1.0% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 7-3

After the following composition was mixed and stirred for 30 minutes, the resulting mixture was filtered off with a membrane filter having a pore diameter of 0.5 μm and further deaerated under vacuum to thereby prepare Yellow Ink 6.

[Composition of Yellow Ink 6]

| | |
|---|---|
| C.I. Direct Yellow 132 | 2.0% |
| (BAYSCRIPT Yellow GGN Liquid, produced by LANXESS Deutschland GmbH) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 1.0% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 7-4

After the following composition was mixed and stirred for 30 minutes, the resulting mixture was filtered off with a membrane filter having a pore diameter of 0.5 μm and further deaerated under vacuum to thereby prepare Black Ink 6.

[Composition of Black Ink 6]

| | |
|---|---|
| C.I. Direct Black 195 | 6.0% |
| (PRO-JET Fast Black 2 Liquid, produced by Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 1.0% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 8-1

After the following composition was mixed and stirred for 30 minutes, the resulting mixture was filtered off with a membrane filter having a pore diameter of 0.5 μm and further deaerated under vacuum to thereby prepare Cyan Ink 7.

[Composition of Cyan Ink 7]

| | |
|---|---|
| C.I. Direct Blue 199 | 2.5% |
| (PRO-JET Cyan 1 Liquid, produced by Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by Structural Formula (II) described above (where Rf represents $CF_2CF_3$, n represents an integer of 4, m represents an integer of 21, and p represents an integer of 4.) | 0.1% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 8-2

After the following composition was mixed and stirred for 30 minutes, the resulting mixture was filtered off with a membrane filter having a pore diameter of 0.5 μm and further deaerated under vacuum to thereby prepare Magenta Ink 7.

[Composition of Magenta Ink 7]

| | |
|---|---|
| C.I. Acid Red 249 | 2.0% |
| (PRO-JET Magenta 1 Liquid, produced by | |
| Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by | 0.1% |
| Structural Formula (II) described above | |
| (where Rf represents $CF_2CF_3$, n represents an | |
| integer of 4, m represents an integer of 21, | |
| and p represents an integer of 4.) | |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 8-3

After the following composition was mixed and stirred for 30 minutes, the resulting mixture was filtered off with a membrane filter having a pore diameter of 0.5 ■ m and further deaerated under vacuum to thereby prepare Yellow Ink 7.

[Composition of Yellow Ink 7]

| | |
|---|---|
| C.I. Direct Yellow 132 | 2.0% |
| (BAYSCRIPT Yellow GGN Liquid, produced by | |
| LANXESS Deutschland GmbH | |
| 3-methyl-1,3-butanediol | 19.0% |
| glycerin | 19.0% |
| 2-ethyl-1,3-hexanediol | 2.0% |
| fluorine-based surfactant represented by | 0.1% |
| Structural Formula (II) described above | |
| (where Rf represents $CF_2CF_3$, n represents an | |
| integer of 4, m represents an integer of 21, | |
| and p represents an integer of 4.) | |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 8-4

After the following composition was mixed and stirred for 30 minutes, the resulting mixture was filtered off with a membrane filter having a pore diameter of 0.5 ■ m and further deaerated under vacuum to thereby prepare Black Ink 7.

[Composition of Black Ink 7]

| | |
|---|---|
| C.I. Direct Black 195 | 6.0% |
| (PRO-JET Fast Black 2 Liquid, produced by | |
| Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by | 0.1% |
| Structural Formula (II) described above | |
| (where Rf represents $CF_2CF_3$, n represents an | |
| integer of 4, m represents an integer of 21, | |
| and p represents an integer of 4.) | |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 9-1

After the following composition was mixed and stirred for 30 minutes, the resulting mixture was filtered off with a membrane filter having a pore diameter of 0.5 ☐m and further deaerated under vacuum to thereby prepare Cyan Ink 8.

[Composition of Cyan Ink 8]

| | |
|---|---|
| C.I. Direct Blue 199 | 2.5% |
| (DAIWA IJ BLUE 319HL, produced by Daiwa | |
| Kasei Industry Co., Ltd.) | |
| ethylene glycol monobutyl ether | 9.5% |
| glycerin | 28.5% |
| 2-ethyl-1,3-hexanediol | 2.0% |
| triethanolamine | 0.5% |
| fluorine-based surfactant represented by | |
| Structural Formula (III) described below | |
| $C_4F_9-CH_2CHCH_2O-(C_2H_4O)_{45}-CH_2CHCH_2-C_4F_9$ | |
| $\phantom{C_4F_9-CH_2CH}\underset{OH}{\|}\phantom{CH_2O-(C_2H_4O)_{45}-CH_2CH}\underset{OH}{\|}$ | |
| PROXEL LV | 0.1% |

Ion exchanged water was added as a balance so that all the ingredients added to the formulation was 100%.

Ink Preparation Example 9-2

After the following composition was mixed and stirred for 30 minutes, the resulting mixture was filtered off with a membrane filter having a pore diameter of 0.5 ■ m and further deaerated under vacuum to thereby prepare Magenta Ink 8.

[Composition of Magenta Ink 8]

| | |
|---|---|
| C.I. Acid Red 249 | 2.0% |
| (PRO-JET Magenta 1 Liquid, produced by | |
| Fuji Film Imaging Colorant Corp.) | |
| ethylene glycol monobutyl ether | 9.5% |
| glycerin | 28.5% |
| 2-ethyl-1,3-hexanediol | 2.0% |
| triethanolamine | 0.5% |
| fluorine-based surfactant represented by | 0.1% |
| Structural Formula (III) described above | |
| PROXEL LV | 0.1% |

Ion exchanged water was added as a balance so that all the ingredients added to the formulation was 100%.

Ink Preparation Example 9-3

After the following composition was mixed and stirred for 30 minutes, the resulting mixture was filtered off with a membrane filter having a pore diameter of 0.5 ■ m and further deaerated under vacuum to thereby prepare Yellow Ink 8.

[Composition of Yellow Ink 8]

| | |
|---|---|
| C.I. Direct Yellow 132 | 2.0% |
| (BAYSCRIPT Yellow GGN Liquid, produced by | |
| LANXESS Deutschland GmbH) | |
| ethylene glycol monobutyl ether | 9.5% |
| glycerin | 28.5% |
| 2-ethyl-1,3-hexanediol | 2.0% |
| triethanolamine | 0.5% |
| fluorine-based surfactant represented by | 0.1% |
| Structural Formula (III) described above | |
| PROXEL LV | 0.1% |

Ion exchanged water was added as a balance so that all the ingredients added to the formulation was 100%.

Ink Preparation Example 9-4

After the following composition was mixed and stirred for 30 minutes, the resulting mixture was filtered off with a membrane filter having a pore diameter of 0.5 ■ m and further deaerated under vacuum to thereby prepare Black Ink 8.
[Composition of Black Ink 8]

| | |
|---|---|
| DUASYN Black HEF-SF Liquid (C.I. DIRECT BLACK 168, dye concentration: 20%, produced by Clariant Japan K.K.) | 30.0% |
| ethylene glycol monobutyl ether | 9.5% |
| glycerin | 28.5% |
| 2-ethyl-1,3-hexanediol | 2.0% |
| triethanolamine | 0.5% |
| fluorine-based surfactant represented by Structural Formula (III) described above | 0.1% |
| PROXEL LV | 0.1% |

Ion exchanged water was added as a balance so that all the ingredients added to the formulation was 100%.

Ink Preparation Example 10-1

After the following composition was mixed and stirred for 30 minutes, the resulting mixture was filtered off with a membrane filter having a pore diameter of 0.5 ■ m and further deaerated under vacuum to thereby prepare Cyan Ink 9.
[Composition of Cyan Ink 9]

| | |
|---|---|
| C.I. Direct Blue 199 (PRO-JET Cyan 1 Liquid, produced by Fuji Film Imaging Colorant Corp.) | 2.5% |
| glycerin | 10.0% |
| 1,3-butanediol | 30.0% |
| 2-ethyl-1,3-hexanediol | 2.0% |
| 2-amino-2-ethyl-1,3-propanediol | 0.5% |
| fluorine-based surfactant (ZONYL SF-300, produced by DuPont) | 0.1% |
| PROXEL LV | 0.1% |

Ion exchanged water was added as a balance so that all the ingredients added to the formulation was 100%.

Ink Preparation Example 10-2

After the following composition was mixed and stirred for 30 minutes, the resulting mixture was filtered off with a membrane filter having a pore diameter of 0.5 ■ m and further deaerated under vacuum to thereby prepare Magenta Ink 9.
[Composition of Magenta Ink 9]

| | |
|---|---|
| C.I.Acid Red 249 (PRO-JET Magenta 1 Liquid, produced by Fuji Film Imaging Colorant Corp.) | 2.0% |
| glycerin | 10.0% |
| 1,3-butanediol | 30.0% |
| 2-ethyl-1,3-hexanediol | 2.0% |
| 2-amino-2-ethyl-1,3-propanediol | 0.5% |
| fluorine-based surfactant (ZONYL SF-300, produced by DuPont) | 0.1% |
| PROXEL LV | 0.1% |

Ion exchanged water was added as a balance so that all the ingredients added to the formulation was 100%.

Ink Preparation Example 10-3

After the following composition was mixed and stirred for 30 minutes, the resulting mixture was filtered off with a membrane filter having a pore diameter of 0.5 ■ m and further deaerated under vacuum to thereby prepare Yellow Ink 9.
[Composition of Yellow Ink 9]

| | |
|---|---|
| C.I. Acid Yellow 23 (Acid Yellow 23, produced by Daiwa Kasei Industry Co., Ltd.) | 2.0% |
| glycerin | 10.0% |
| 1,3-butanediol | 30.0% |
| 2-ethyl-1,3-hexanediol | 2.0% |
| 2-amino-2-ethyl-1,3-propanediol | 0.5% |
| fluorine-based surfactant (ZONYL SF-300, produced by DuPont) | 0.1% |
| PROXEL LV | 0.1% |

Ion exchanged water was added as a balance so that all the ingredients added to the formulation was 100%.

Ink Preparation Example 10-4

After the following composition was mixed and stirred for 30 minutes, the resulting mixture was filtered off with a membrane filter having a pore diameter of 0.5 ■ m and further deaerated under vacuum to thereby prepare Black Ink 9.
[Composition of Black Ink 9]

| | |
|---|---|
| DUASYN Black HEF-SF Liquid (C.I. DIRECT BLACK 168, dye concentration: 20%, produced by Clariant Japan K.K.) | 30.0% |
| glycerin | 10.0% |
| 1,3-butanediol | 30.0% |
| 2-ethyl-1,3-hexanediol | 2.0% |
| 2-amino-2-ethyl-1,3-propanediol | 0.5% |
| fluorine-based surfactant (ZONYL SF-300, produced by DuPont) | 0.1% |
| PROXEL LV | 0.1% |

Ion exchanged water was added as a balance so that all the ingredients added to the formulation was 100%.

Ink Preparation Example 11-1

After the following composition was mixed and stirred for 30 minutes, the resulting mixture was filtered off with a membrane filter having a pore diameter of 0.5 ■ m and further deaerated under vacuum to thereby prepare Cyan Ink 10.
[Composition of Cyan Ink 10]

| | |
|---|---|
| C.I. Direct Blue 86 (Direct Blue 86, produced by Daiwa Kasei Industry Co., Ltd.) | 3.0% |
| glycerin | 23.0% |
| ethylene glycol monobutyl ether | 23.0% |
| 2-ethyl-1,3-hexanediol | 2.0% |
| 2-amino-2-ethyl-1,3-propanediol | 0.3% |
| PROXEL LV | 0.1% |

Ion exchanged water was added as a balance so that all the ingredients added to the formulation was 100%.

Ink Preparation Example 11-2

After the following composition was mixed and stirred for 30 minutes, the resulting mixture was filtered off with a membrane filter having a pore diameter of 0.5 ■ m and further deaerated under vacuum to thereby prepare Magenta Ink 10.
[Composition of Magenta Ink 10]

| | |
|---|---|
| C.I. Reactive Red 31 | 2.5% |
| (PRO-JET Magenta 3B-OA Liquid, produced by Fuji Film Imaging Colorant Corp.) | |
| glycerin | 23.0% |
| ethylene glycol monobutyl ether | 23.0% |
| 2-ethyl-1,3-hexanediol | 2.0% |
| 2-amino-2-ethyl-1,3-propanediol | 0.3% |
| PROXEL LV | 0.1% |

Ion exchanged water was added as a balance so that all the ingredients added to the formulation was 100%.

Ink Preparation Example 11-3

After the following composition was mixed and stirred for 30 minutes, the resulting mixture was filtered off with a membrane filter having a pore diameter of 0.5 ■ m and further deaerated under vacuum to thereby prepare Yellow Ink 10.
[Composition of Yellow Ink 10]

| | |
|---|---|
| C.I. Acid Yellow 23 | 2.0% |
| (Acid Yellow 23, produced by Daiwa Kasei Industry Co., Ltd.) | |
| glycerin | 23.0% |
| ethylene glycol monobutyl ether | 23.0% |
| 2-ethyl-1,3-hexanediol | 2.0% |
| 2-amino-2-ethyl-1,3-propanediol | 0.3% |
| PROXEL LV | 0.1% |

Ion exchanged water was added as a balance so that all the ingredients added to the formulation was 100%.

Ink Preparation Example 11-4

After the following composition was mixed and stirred for 30 minutes, the resulting mixture was filtered off with a membrane filter having a pore diameter of 0.5 ■ m and further deaerated under vacuum to thereby prepare Black Ink 10.
[Composition of Black Ink 10]

| | |
|---|---|
| BAYSCRIPT Black SP liquid | 20.0% |
| (dye concentration: 30%, produced by LANXESS Deutschland GmbH) | |
| glycerin | 23.0% |
| ethylene glycol monobutyl ether | 23.0% |
| 2-ethyl-1,3-hexanediol | 2.0% |
| 2-amino-2-ethyl-1,3-propanediol | 0.3% |
| PROXEL LV | 0.1% |

Ion exchanged water was added as a balance so that all the ingredients added to the formulation was 100%.

Ink Preparation Example 12-1

After the following composition was mixed and stirred for 30 minutes, the resulting mixture was filtered off with a membrane filter having a pore diameter of 0.5 ■ m and further deaerated under vacuum to thereby prepare Cyan Ink 11.
[Composition of Cyan Ink 11]

| | |
|---|---|
| C.I. Direct Blue 86 | 3.0% |
| (Direct Blue 86, produced by Daiwa Kasei Industry Co., Ltd.) | |
| glycerin | 10.0% |
| 1,3-butanediol | 30.0% |
| 2-ethyl-1,3-hexanediol | 2.0% |
| 2-amino-2-ethyl-1,3-propanediol | 0.5% |
| fluorine-based surfactant | 0.1% |
| (ECTD-3NEX, produced by Nikko Chemicals Co., Ltd.) | |
| PROXEL LV | 0.1% |

Ion exchanged water was added as a balance so that all the ingredients added to the formulation was 100%.

Ink Preparation Example 12-2

After the following composition was mixed and stirred for 30 minutes, the resulting mixture was filtered off with a membrane filter having a pore diameter of 0.5 ■ m and further deaerated under vacuum to thereby prepare Magenta Ink 11.
[Composition of Magenta Ink 11]

| | |
|---|---|
| C.I. Acid Red 249 | 2.0% |
| (PRO-JET Magenta 1 Liquid, produced by Fuji Film Imaging Colorant Corp.) | |
| glycerin | 10.0% |
| 1,3-butanediol | 30.0% |
| 2-ethyl-1,3-hexanediol | 2.0% |
| 2-amino-2-ethyl-1,3-propanediol | 0.5% |
| fluorine-based surfactant | 0.1% |
| (ECTD-3NEX, produced by Nikko Chemicals Co., Ltd.) | |
| PROXEL LV | 0.1% |

Ion exchanged water was added as a balance so that all the ingredients added to the formulation was 100%.

Ink Preparation Example 12-3

After the following composition was mixed and stirred for 30 minutes, the resulting mixture was filtered off with a membrane filter having a pore diameter of 0.5 ■ m and further deaerated under vacuum to thereby prepare Yellow Ink 11.
[Composition of Yellow Ink 11]

| | |
|---|---|
| C.I. Direct Yellow 132 | 2.0% |
| (BAYSCRIPT Yellow GGN Liquid, produced by LANXESS Deutschland GmbH) | |
| glycerin | 10.0% |
| 1,3-butanediol | 30.0% |
| 2-ethyl-1,3-hexanediol | 2.0% |
| 2-amino-2-ethyl-1,3-propanediol | 0.5% |
| fluorine-based surfactant | 0.1% |
| (ECTD-3NEX, produced by Nikko Chemicals Co., Ltd.) | |
| PROXEL LV | 0.1% |

Ion exchanged water was added as a balance so that all the ingredients added to the formulation was 100%.

Ink Preparation Example 12-4

After the following composition was mixed and stirred for 30 minutes, the resulting mixture was filtered off with a membrane filter having a pore diameter of 0.5 μm and further deaerated under vacuum to thereby prepare Black Ink 11.

[Composition of Black Ink 11]

| | |
|---|---|
| DUASYN Black HEF-SF Liquid (C.I. DIRECT BLACK 168, dye concentration: 20%, produced by Clariant Japan K.K.) | 30.0% |
| glycerin | 10.0% |
| 1,3-butanediol | 30.0% |
| 2-ethyl-1,3-hexanediol | 2.0% |
| 2-amino-2-ethyl-1,3-propanediol | 0.5% |
| fluorine-based surfactant (ECTD-3NEX, produced by Nikko Chemicals Co., Ltd.) | 0.1% |
| PROXEL LV | 0.1% |

Ion exchanged water was added as a balance so that all the ingredients added to the formulation was 100%.

Ink Preparation Example 13-1

After the following composition was mixed and stirred for 30 minutes, the resulting mixture was filtered off with a membrane filter having a pore diameter of 0.5 μm and further deaerated under vacuum to thereby prepare Cyan Ink 12.

[Composition of Cyan Ink 12]

| | |
|---|---|
| C.I. Direct Blue 86 (Direct Blue 86, produced by Daiwa Kasei Industry Co., Ltd.) | 3.0% |
| ethylene glycol monobutyl ether | 9.5% |
| glycerin | 28.5% |
| 2-ethyl-1,3-hexanediol | 2.0% |
| triethanolamine | 0.5% |
| fluorine-based surfactant (UNISAFE A-LY produced by NOF CORPORATION) | 0.1% |
| PROXEL LV | 0.1% |

Ion exchanged water was added as a balance so that all the ingredients added to the formulation was 100%.

Ink Preparation Example 13-2

After the following composition was mixed and stirred for 30 minutes, the resulting mixture was filtered off with a membrane filter having a pore diameter of 0.5 μm and further deaerated under vacuum to thereby prepare Magenta Ink 12.

[Composition of Magenta Ink 12]

| | |
|---|---|
| C.I. Acid Red 249 (PRO-JET Magenta 1 Liquid, produced by Fuji Film Imaging Colorant Corp.) | 2.0% |
| ethylene glycol monobutyl ether | 9.5% |
| glycerin | 28.5% |
| 2-ethyl-1,3-hexanediol | 2.0% |
| triethanolamine | 0.5% |
| fluorine-based surfactant (UNISAFE A-LY produced by NOF CORPORATION) | 0.1% |
| PROXEL LV | 0.1% |

Ion exchanged water was added as a balance so that all the ingredients added to the formulation was 100%.

Ink Preparation Example 13-3

After the following composition was mixed and stirred for 30 minutes, the resulting mixture was filtered off with a membrane filter having a pore diameter of 0.5 μm and further deaerated under vacuum to thereby prepare Yellow Ink 12.

[Composition of Yellow Ink 12]

| | |
|---|---|
| C.I. Direct Yellow 132 (BAYSCRIPT Yellow GGN Liquid, produced by LANXESS Deutschland GmbH) | 2.0% |
| ethylene glycol monobutyl ether | 9.5% |
| glycerin | 28.5% |
| 2-ethyl-1,3-hexanediol | 2.0% |
| triethanolamine | 0.5% |
| fluorine-based surfactant (UNISAFE A-LY produced by NOF CORPORATION) | 0.1% |
| PROXEL LV | 0.1% |

Ion exchanged water was added as a balance so that all the ingredients added to the formulation was 100%.

Ink Preparation Example 13-4

After the following composition was mixed and stirred for 30 minutes, the resulting mixture was filtered off with a membrane filter having a pore diameter of 0.5 μm and further deaerated under vacuum to thereby prepare Black Ink 12.

[Composition of Black Ink 12]

| | |
|---|---|
| DUASYN Black HEF-SF Liquid (C.I. DIRECT BLACK 168, dye concentration: 20%, produced by Clariant Japan K.K.) | 30.0% |
| ethylene glycol monobutyl ether | 9.5% |
| glycerin | 28.5% |
| 2-ethyl-1,3-hexanediol | 2.0% |
| triethanolamine | 0.5% |
| fluorine-based surfactant (UNISAFE A-LY produced by NOF CORPORATION) | 0.1% |
| PROXEL LV | 0.1% |

Ion exchanged water was added as a balance so that all the ingredients added to the formulation was 100%.

Ink Preparation Example 14-1

After the following composition was mixed and stirred for 30 minutes, the resulting mixture was filtered off with a membrane filter having a pore diameter of 0.5 μm and further deaerated under vacuum to thereby prepare Cyan Ink 13.

[Composition of Cyan Ink 13]

| | |
|---|---|
| C.I. Direct Blue 199 (PRO-JET Cyan 1 Liquid, produced by Fuji Film Imaging Colorant Corp.) | 2.5% |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.05% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 14-2

After the following composition was mixed and stirred for 30 minutes, the resulting mixture was filtered off with a membrane filter having a pore diameter of 0.5 μm and further deaerated under vacuum to thereby prepare Magenta Ink 13.

[Composition of Magenta Ink 13]

| | |
|---|---|
| C.I. Acid Red 249 | 2.0% |
| (PRO-JET Magenta 1 Liquid, produced by Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.05% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 14-3

After the following composition was mixed and stirred for 30 minutes, the resulting mixture was filtered off with a membrane filter having a pore diameter of 0.5 μm and further deaerated under vacuum to thereby prepare Yellow Ink 13.

[Composition of Yellow Ink 13]

| | |
|---|---|
| C.I. Direct Yellow 132 | 2.0% |
| (BAYSCRIPT Yellow GGN Liquid, produced by LANXESS Deutschland GmbH) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.05% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 14-4

After the following composition was mixed and stirred for 30 minutes, the resulting mixture was filtered off with a membrane filter having a pore diameter of 0.5 μm and further deaerated under vacuum to thereby prepare Black Ink 13.

[Composition of Black Ink 13]

| | |
|---|---|
| C.I. Direct Black 195 | 6.0% |
| (PRO-JET Fast Black 2 Liquid, produced by Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 0.05% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 15-1

After the following composition was mixed and stirred for 30 minutes, the resulting mixture was filtered off with a membrane filter having a pore diameter of 0.5 μm and further deaerated under vacuum to thereby prepare Cyan Ink 14.

[Composition of Cyan Ink 14]

| | |
|---|---|
| C.I. Direct Blue 86 | 3.0% |
| (Direct Blue 86, produced by Daiwa Kasei Industry Co., Ltd.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 15% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 15-2

After the following composition was mixed and stirred for 30 minutes, the resulting mixture was filtered off with a membrane filter having a pore diameter of 0.5 μm and further deaerated under vacuum to thereby prepare Magenta Ink 14.

[Composition of Magenta Ink 14]

| | |
|---|---|
| C.I. Reactive Red 31 | 2.5% |
| (PRO-JET Magenta 3B-OA Liquid, produced by Fuji Film Imaging Colorant Corp.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 15% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 15-3

After the following composition was mixed and stirred for 30 minutes, the resulting mixture was filtered off with a membrane filter having a pore diameter of 0.5 μm and further deaerated under vacuum to thereby prepare Yellow Ink 14.

[Composition of Yellow Ink 14]

| | |
|---|---|
| C.I. Acid Yellow 23 | 2.0% |
| (Acid Yellow 23, produced by Daiwa Kasei Industry Co., Ltd.) | |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 15% |
| PROXEL LV | 0.1% |
| 2-amino-2-ethyl-1,3-propanediol | 0.2% |

Ion exchanged water was added as a balance so that all the ingredients added to the formulation was 100%.

Ink Preparation Example 15-4

After the following composition was mixed and stirred for 30 minutes, the resulting mixture was filtered off with a membrane filter having a pore diameter of 0.5 ■ m and further deaerated under vacuum to thereby prepare Black Ink 14.

[Composition of Black Ink 14]

| | |
|---|---|
| C.I. Direct Black 195 (PRO-JET Fast Black 2 Liquid, produced by Fuji Film Imaging Colorant Corp.) | 6.0% |
| 3-methyl-1,3-butanediol | 19.0% |
| glycerin | 19.0% |
| 2-ethyl-1,3-hexanediol | 2.0% |
| fluorine-based surfactant represented by Structural Formula (I) described above (where Rf represents $(CF_2)_4F$, X represents an integer of 2, and Y represents an integer of 2.) | 15% |
| PROXEL LV | 0.1% |
| 2-amino-2-ethyl-1,3-propanediol | 0.2% |

Ion exchanged water was added as a balance so that all the ingredients added to the formulation was 100%.

Examples 2-1 to 2-8, Comparative Examples 2-1 to 2-6

Inkjet recording ink sets of Examples 2.1 to 2-8 and Comparative Examples 2-1 to 2-6 were each prepared using the inks of Preparation Examples 2-1 to 15-4 in the combination shown in Table 6.

Note that the inkjet recording ink set of Comparative Example 2-1 had the same composition as that of Example 2-1, except that the fluorine-based surfactant was changed.

The inkjet recording ink set of Comparative Example 2-2 described below had the same composition as that of Example 2-2, except that the fluorine-based surfactant was changed.

The inkjet recording ink set of Comparative Example 2-3 described below had the same composition as that of Example 2-3, except that the fluorine-based surfactant was changed.

The inkjet recording ink set of Comparative Example 2-4 described below had the same composition as that of Example 2-4, except that the fluorine-based surfactant was not added.

The inkjet recording ink set of Comparative Example 2-5 described below had the same composition as that of Example 2-3, except that the fluorine-based surfactant was changed.

The inkjet recording ink set of Comparative Example 2-6 described below had the same composition as that of Example 2-2, except that the fluorine-based surfactant was changed.

The inkjet recording ink set of Example 2-7 described below had the same composition as that of Example 2-1, except that the addition amount of the compound represented by Structural Formula (I) was changed to 0.05%.

The inkjet recording ink set of Example 2-8 described below had the same composition as that of Example 2-1, except that the addition amount of the compound represented by Structural Formula (I) was changed to 15%.

TABLE 6

| | Inkjet recording ink set | | | |
|---|---|---|---|---|
| | Cyan | Magenta | Yellow | Black |
| Ex. 2-1 | Preparation Ex. 2-1 | Preparation Ex. 2-2 | Preparation Ex. 2-3 | Preparation Ex. 2-4 |
| Ex. 2-2 | Preparation Ex. 3-1 | Preparation Ex. 3-2 | Preparation Ex. 3-3 | Preparation Ex. 3-4 |
| Ex. 2-3 | Preparation Ex. 4-1 | Preparation Ex. 4-2 | Preparation Ex. 4-3 | Preparation Ex. 4-4 |
| Ex. 2-4 | Preparation Ex. 5-1 | Preparation Ex. 5-2 | Preparation Ex. 5-3 | Preparation Ex. 5-4 |
| Ex. 2-5 | Preparation Ex. 6-1 | Preparation Ex. 6-2 | Preparation Ex. 6-3 | Preparation Ex. 6-4 |
| Ex. 2-6 | Preparation Ex. 7-1 | Preparation Ex. 7-2 | Preparation Ex. 7-3 | Preparation Ex. 7-4 |
| Comp. Ex. 2-1 | Preparation Ex. 8-1 | Preparation Ex. 8-2 | Preparation Ex. 8-3 | Preparation Ex. 8-4 |
| Comp. Ex. 2-2 | Preparation Ex. 9-1 | Preparation Ex. 9-2 | Preparation Ex. 9-3 | Preparation Ex. 9-4 |
| Comp. Ex. 2-3 | Preparation Ex. 10-1 | Preparation Ex. 10-2 | Preparation Ex. 10-3 | Preparation Ex. 10-4 |
| Comp. Ex. 2-4 | Preparation Ex. 11-1 | Preparation Ex. 11-2 | Preparation Ex. 11-3 | Preparation Ex. 11-4 |
| Comp. Ex. 2-5 | Preparation Ex. 12-1 | Preparation Ex. 12-2 | Preparation Ex. 12-3 | Preparation Ex. 12-4 |
| Comp. Ex. 2-6 | Preparation Ex. 13-1 | Preparation Ex. 13-2 | Preparation Ex. 13-3 | Preparation Ex. 13-4 |
| Ex. 2-7 | Preparation Ex. 14-1 | Preparation Ex. 14-2 | Preparation Ex. 14-3 | Preparation Ex. 14-4 |
| Ex. 2-8 | Preparation Ex. 15-1 | Preparation Ex. 15-2 | Preparation Ex. 15-3 | Preparation Ex. 15-4 |

Next, the inkjet recording ink sets prepared in Examples 2-1 to 2-8 and Comparative Examples 2-1 to 2-6 were each evaluated for their various properties as follows. The evaluation results are shown in Tables 7 to 9.

Evaluation 5: Evaluation Test of Anti-Foaming Properties

After the preparation, each of the inkjet recording inks was stored at 50° C. for one month. Thereafter, 10 mL of each of the inkjet recording inks was placed in a 100 mL graduated cylinder under the condition of 10° C., and air having a certain pressure was injected to the cylinder until the volume of the ink and air bubbles was 100 mL, and the injection of air was stopped at the time when the volume of the ink and air bubbles reached 100 mL. The time passed from when the injection was stopped to when the volume of the ink and air bubbles reached 20 mL was measured, and the time was regarded as an anti-foaming time. The inkjet recording inks were evaluated based on the following criteria. Note that grade A or B is within the acceptable range.

[Evaluation Criteria]

AA: The anti-foaming time was shorter than 5 seconds

A: The anti-foaming time was 5 seconds or longer but shorter than 10 seconds.

B: The anti-foaming time was 10 seconds or longer but shorter than 30 seconds.

C: The anti-foaming time was 30 seconds or longer but shorter than 300 seconds.

D: The anti-foaming time was longer than 300 seconds.

The results are shown in Table 7.

TABLE 7

| | Evaluation of Anti-Foaming Properties | | | |
|---|---|---|---|---|
| | Cyan | Magenta | Yellow | Black |
| Ex. 2-1 | A | A | A | A |
| Ex. 2-2 | A | A | A | AA |
| Ex. 2-3 | A | AA | A | A |

TABLE 7-continued

Evaluation of Anti-Foaming Properties

|  | Cyan | Magenta | Yellow | Black |
|---|---|---|---|---|
| Ex. 2-4 | A | A | A | A |
| Ex. 2-5 | AA | AA | AA | AA |
| Ex. 2-6 | A | A | A | A |
| Comp. Ex. 2-1 | B | B | B | B |
| Comp. Ex. 2-2 | B | B | B | B |
| Comp. Ex. 2-3 | C | C | C | C |
| Comp. Ex. 2-4 | D | D | D | D |
| Comp. Ex. 2-5 | C | C | C | C |
| Comp. Ex. 2-6 | C | C | C | C |
| Ex. 2-7 | B | B | B | B |
| Ex. 2-8 | B | B | B | B |

Evaluation 6; Evaluation of Discharge Stability

Using an inkjet printer (IPSIOG707, manufactured by Ricoh Company Ltd.) filled with each of the inkjet recording inks prepared in Examples 2-1 to 2-8 and Comparative Examples 2-1 to 2-6, printing was performed on MY PAPER (produced by Ricoh Company Ltd.). A chart with a print area of 5% for each color in the image area in the total area of the paper was used as a print pattern, and each of the yellow, magenta, cyan and black inks was printed with 100% duty, under the printing conditions: recording density: 360 dpi and one-pass printing.

In addition, using each of the inkjet recording ink sets of Examples 2-1 to 2-8 and Comparative Examples 2-1 to 2-6, Evaluation 5 described above was carried out, and then Evaluation 7 described below was carried out. As intermittent printing, 20 sheets of the chart were continuously printed, and then the printer was set to a paper feed state where ink discharge was not performed for 20 minutes. This operation was repeated 50 times to print 1,000 sheets in cumulative total, and then one more sheet of the same chart was printed. Then, the presence or absence of streaks, white spots and jetting disturbance in the 5% solid part of the chart at this point was visually observed, evaluated based on the following criteria. Note that grade A or B is within the acceptable range.

[Evaluation Criteria]

A: No streak, white spot and jetting disturbance was found in the solid part.

B: Streaks, white spots and jetting disturbance were slightly recognized in the solid part.

C: Streaks, white spots and jetting disturbance were recognized at the first scanning.

D: Streaks, white spots and jetting disturbance were recognized across the solid part.

The results are shown in Table 8.

TABLE 8

Evaluation of Discharge Stability

|  | Cyan | Magenta | Yellow | Black |
|---|---|---|---|---|
| Ex. 2-1 | A | A | A | A |
| Ex. 2-2 | A | A | A | A |
| Ex. 2-3 | A | A | A | A |
| Ex. 2-4 | A | A | A | A |
| Ex. 2-5 | A | A | A | A |
| Ex. 2-6 | A | A | A | A |
| Comp. Ex. 2-1 | B | C | B | B |
| Comp. Ex. 2-2 | B | B | A | B |
| Comp. Ex. 2-3 | C | C | C | C |
| Comp. Ex. 2-4 | C | C | B | B |
| Comp. Ex. 2-5 | C | C | C | C |
| Comp. Ex. 2-6 | B | C | C | C |
| Ex. 2-7 | C | C | B | C |
| Ex. 2-8 | B | C | C | C |

Evaluation 7; Evaluation of Color Bleed

Using an inkjet printer (IPSIOG707, manufactured by Ricoh Company Ltd.) filled with each of the inkjet recording inks prepared in Examples 2-1 to 2-8 and Comparative Examples 2-1 to 2-6, Red (produced by) and Green (produced by), printing was performed. Specifically, using a print pattern in which letters printed with each black ink in a solid image part composed of magenta, cyan, yellow and the above-mentioned color inks of Red and Green, printing was performed on MY PAPER (produced by Ricoh Company Ltd.) as test paper. The printing conditions were set to 100% duty, 300 dpi as recording density, and one pass printing.

Further, Red of the above mentioned is made by mixing a magenta ink and a yellow ink, and the magenta ink and the yellow ink are prepared in Examples 2-1 to 2-8 and Comparative examples 2-1 to 2-6. Green of the above mentioned is made by mixing a cyan and a yellow, and the cyan and the yellow are prepared in Examples 2-1 to 2-8 and Comparative examples 2-1 to $2^{-6}$. Color bleed between each color ink and the black ink in the image obtained in the test was visually observed and evaluated based on the following criteria. Note that grade A or B is within the acceptable range.

[Evaluation Criteria]

A: No color bleed was observed, and letters of the black ink were clearly recognized.

B: Slight amount of color bleed occurred, and letters of the black ink slightly oozed.

C: Color bleed occurred, and letters of the black ink oozed but recognized.

D: Color bleed occurred, and it was difficult to recognize letters of the black ink.

The results are shown in Table 9.

TABLE 9

Evaluation of Color Bleed

|  | Black/Yellow | Black/Magenta | Black/Cyan | Black/Red | Black/Green |
|---|---|---|---|---|---|
| Ex. 2-1 | A | A | A | A | A |
| Ex. 2-2 | A | A | A | B | A |
| Ex. 2-3 | A | A | B | B | A |
| Ex. 2-4 | A | A | A | A | B |
| Ex. 2-5 | A | A | A | A | A |
| Ex. 2-6 | A | A | A | A | A |
| Comp. Ex. 2-1 | B | B | B | C | C |
| Comp. Ex. 2-2 | C | C | C | C | C |
| Comp. Ex. 2-3 | C | D | C | C | C |

TABLE 9-continued

Evaluation of Color Bleed

| | Black/Yellow | Black/Magenta | Black/Cyan | Black/Red | Black/Green |
|---|---|---|---|---|---|
| Comp. Ex. 2-4 | D | D | D | D | D |
| Comp. Ex. 2-5 | C | C | C | D | D |
| Comp. Ex. 2-6 | C | C | C | D | D |
| Ex. 2-7 | C | D | C | D | D |
| Ex. 2-8 | D | C | C | D | D |

The inkjet recording ink of the present invention can be suitably used in various recording systems employing an inkjet recording method, for example, it can be suitably used in inkjet printers, facsimiles, copiers and the like.

The invention claimed is:

1. An inkjet recording ink comprising:
   at least one water-soluble organic solvent,
   at least one colorant,
   at least one fluorine-based surfactant having a chemical structure represented by Structural Formula (I), and
   water,

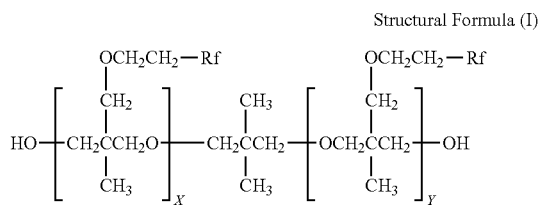

Structural Formula (I)

wherein Rf represents any one of $CF_3$, $CF_2CF_3$, $(CF_2)_2CF_3$, and $(CF_2)_3CF_3$, and X plus Y is an integer of 4 or 5.

2. The inkjet recording ink according to claim 1, wherein an amount of the fluorine-based surfactant is 0.01% by mass to 10% by mass based on the total mass of the inkjet recording ink.

3. The inkjet recording ink according to claim 2, wherein the amount of fluorine-based surfactant is 0.1% by mass to 5.0% by mass.

4. The inkjet recording ink according to claim 1, wherein X is 1 to 4, and Y is 1 to 4.

5. The inkjet recording ink according to claim 1, wherein Rf is $(CF_2)_3CF_3$, X is 2, and Y is 2.

6. The inkjet recording ink according to claim 1, wherein the colorant is at least one selected from the group consisting of a dye, a pigment and a colored fine particle.

7. The inkjet recording ink according to claim 6, wherein the at least one colorant is dye.

8. The inkjet recording ink according to claim 1, wherein the ink further comprises at least one surfactant different from the at least one fluorine-based surfactant of formula (I) is at least one selected from the group consisting of a nonionic surfactant, an anionic surfactant, an amphoteric surfactant and an acetylene glycol based surfactant.

9. The inkjet recording ink according to claim 1, wherein the at least one water-soluble organic solvent is selected from the group consisting of glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, ethylene glycol monobutyl ether, 1,6-hexanediol, 2-methyl-2,4-pentanediol, 3-methyl-1,5-pentanediol, polyethylene glycol, 1,2,4-butane triol, 1,2,6-hexane triol, thiodiglycol, 2-pyrrolidone, N-methyl-2-pyrrolidone, and N-hydroxyethyl-2-pyrrolidone, with 3-methyl-1,3-butanediol, 2-methyl-2,4-pentanediol, 1,3-butanediol, and 3-methyl-1,5-pentanediol.

10. The inkjet recording ink according to claim 1, wherein a content of the least one water-soluble organic solvent is from 10 to 50% by mass of the mass of the inkjet recording ink.

11. The inkjet recording ink according to claim 8, wherein a content of the at least one surfactant different from the at least one fluorine-based surfactant of formula (I) is 0.2 to 2.0% by mass of the mass of the inkjet recording ink.

12. An inkjet recording ink set comprising:
   an inkjet recording ink according to claim 1, wherein the colorant is a black colorant, and
   at least one inkjet recording ink according to claim 1, wherein the colorant is a colored colorant.

13. An inkjet recording ink cartridge comprising:
   at least one container comprising the inkjet recording ink according to claim 1.

14. A method for forming a printed image on a substrate, comprising:
   discharging an inkjet ink from a cartridge to form an ink drop; and
   directing the ink drop onto the substrate in the form of the image;
   wherein
   the inkjet ink comprises:
      at least one water-soluble organic solvent,
      at least one colorant,
      at least one fluorine-based surfactant of formula (I), and
      water,

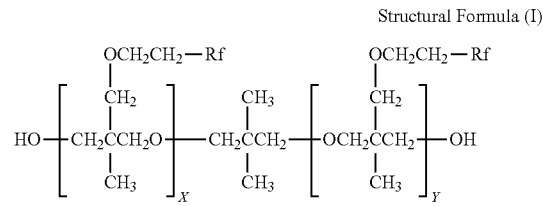

Structural Formula (I)

wherein Rf represents any one of $CF_3$, $CF_2CF_3$, $(CF_2)_2CF_3$, and $(CF_2)_3CF_3$, and X plus Y is an integer of 4 or 5.

15. An apparatus for forming a image comprising:
   an inkjet ink discharging unit configured to discharge an ink drop to form an image, the inkjet ink comprises:
      at least one water-soluble organic solvent,
      at least one colorant,
      at least one fluorine-based surfactant of formula (I), and
      water, Structural Formula (I)
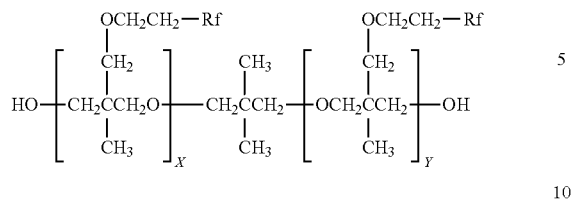
wherein Rf represents any one of $CF_3$, $CF_2CF_3$, $(CF_2)_2CF_3$, and $(CF_2)_3CF_3$, and X plus Y is an integer of 4 or 5.
* * * * *